(12) United States Patent
Hines et al.

(10) Patent No.: US 9,736,457 B2
(45) Date of Patent: Aug. 15, 2017

(54) APPARATUS AND METHOD FOR PROVIDING MEDIA CONTENT

(71) Applicant: AT&T INTELLECTUAL PROPERTY I, LP, Atlanta, GA (US)

(72) Inventors: Tara Hines, New York, NY (US); Andrea Basso, Turin (IT); Aleksey Ivanov, Middletown, NJ (US); Jeffrey Mikan, Atlanta, GA (US); Nadia Morris, Sunnyvale, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/002,561

(22) Filed: Jan. 21, 2016

(65) Prior Publication Data

US 2016/0142698 A1  May 19, 2016

Related U.S. Application Data

(63) Continuation of application No. 14/682,690, filed on Apr. 9, 2015, now Pat. No. 9,270,973, which is a continuation of application No. 13/173,310, filed on Jun. 30, 2011, now Pat. No. 9,030,522.

(51) Int. Cl.
    *H04N 7/14*     (2006.01)
    *H04N 13/00*    (2006.01)
    *H04N 7/15*     (2006.01)
    *H04L 29/06*    (2006.01)

(52) U.S. Cl.
    CPC ....... *H04N 13/0059* (2013.01); *H04L 65/403* (2013.01); *H04L 65/4015* (2013.01); *H04L 65/4076* (2013.01); *H04L 65/605* (2013.01); *H04N 7/15* (2013.01); *H04N 13/0051* (2013.01)

(58) Field of Classification Search
    CPC ...................................................... H04N 7/14
    USPC .......... 348/14.01, 14.08, 14.09, 14.11, 14.12
    See application file for complete search history.

(56) References Cited

U.S. PATENT DOCUMENTS

| | | | |
|---|---|---|---|
| 2,832,821 | A | 4/1958 | Du Mont |
| 4,649,425 | A | 3/1987 | Pund |
| 5,012,351 | A | 4/1991 | Isono |
| 5,293,529 | A | 3/1994 | Yoshimura et al. |
| 5,353,269 | A | 10/1994 | Kobayashi et al. |

(Continued)

OTHER PUBLICATIONS

Edwards, "Active Shutter 3D Technology for HDTV", PhysOrg.com; 12 pages; Sep. 25,2009; http://www.physorg.com/news173082582.html; web site last visited May 10, 2010.

*Primary Examiner* — Olisa Anwah
(74) *Attorney, Agent, or Firm* — Guntin & Gust, PLC; Jay H. Anderson

(57) ABSTRACT

A system that incorporates teachings of the present disclosure may, for example, receive a request for a telepresence seat at an event, obtain media content comprising event images of the event that are captured by an event camera system, receive images that are captured by a camera system at a user location, and provide the media content and video content representative of the images to a processor for presentation at a display device utilizing a telepresence configuration that simulates the first and second users being present at the event, where the providing of the first and second video content establishes a communication session between the first and second users. Other embodiments are disclosed.

20 Claims, 10 Drawing Sheets

(56) References Cited

U.S. PATENT DOCUMENTS

| | | |
|---|---|---|
| 5,392,266 A | 2/1995 | Kobayashi et al. |
| 5,465,175 A | 11/1995 | Woodgate |
| 6,014,164 A | 1/2000 | Woodgate |
| 6,115,177 A | 9/2000 | Vossler |
| 6,144,375 A | 11/2000 | Jain et al. |
| 6,188,442 B1 | 2/2001 | Narayanaswami |
| 6,243,054 B1 | 6/2001 | DeLuca |
| 6,285,368 B1 | 9/2001 | Sudo |
| 6,535,241 B1 | 3/2003 | McDowall |
| 6,559,813 B1 | 5/2003 | DeLuca |
| 6,654,721 B2 | 11/2003 | Handelman |
| 6,725,463 B1 | 4/2004 | Birleson |
| 6,859,549 B1 | 2/2005 | Oliensis |
| 6,924,833 B1 | 8/2005 | McDowall |
| 6,965,381 B2 | 11/2005 | Kitamura |
| 7,106,358 B2 | 9/2006 | Valliath et al. |
| 7,204,592 B2 | 4/2007 | O'Donnell |
| 7,245,430 B2 | 7/2007 | Kobayashi et al. |
| 7,391,443 B2 | 6/2008 | Kojima et al. |
| 7,613,927 B2 | 11/2009 | Holovacs |
| 7,785,201 B2 | 8/2010 | Hashimoto |
| 7,813,543 B2 | 10/2010 | Modén |
| 8,111,282 B2 | 2/2012 | Cutler et al. |
| 8,117,281 B2 | 2/2012 | Robinson et al. |
| 8,254,668 B2 | 8/2012 | Mashitani |
| 8,305,914 B2 | 11/2012 | Thielman et al. |
| 8,370,873 B2 | 2/2013 | Shintani |
| 8,416,278 B2 | 4/2013 | Kim et al. |
| 8,436,888 B1 | 5/2013 | Baldino et al. |
| 8,438,502 B2 | 5/2013 | Friedman et al. |
| 8,456,507 B1 | 6/2013 | Mallappa et al. |
| 8,552,983 B2 | 10/2013 | Chiu |
| 8,644,467 B2 | 2/2014 | Catchpole et al. |
| 8,675,067 B2 | 3/2014 | Chou et al. |
| 9,077,846 B2 | 7/2015 | Pradeep |
| 9,325,943 B2 | 4/2016 | Wilson et al. |
| 2002/0009137 A1 | 1/2002 | Nelson |
| 2002/0122145 A1 | 9/2002 | Tung |
| 2002/0122585 A1 | 9/2002 | Swift et al. |
| 2003/0043262 A1 | 3/2003 | Takemoto |
| 2003/0090592 A1 | 5/2003 | Callway et al. |
| 2003/0128273 A1 | 7/2003 | Matsui |
| 2003/0128871 A1 | 7/2003 | Naske et al. |
| 2003/0132951 A1 | 7/2003 | Sorokin et al. |
| 2003/0214630 A1 | 11/2003 | Winterbotham |
| 2003/0223499 A1 | 12/2003 | Routhier et al. |
| 2003/0231179 A1 | 12/2003 | Suzuki |
| 2004/0013252 A1 | 1/2004 | Craner et al. |
| 2004/0027452 A1 | 2/2004 | Yun |
| 2004/0104864 A1 | 6/2004 | Nakada |
| 2004/0109093 A1 | 6/2004 | Small-Stryker |
| 2004/0150585 A1 | 8/2004 | Tomisawa et al. |
| 2004/0218104 A1 | 11/2004 | Smith |
| 2004/0233275 A1 | 11/2004 | Tomita et al. |
| 2005/0041736 A1 | 2/2005 | Butler-Smith et al. |
| 2005/0066165 A1 | 3/2005 | Peled et al. |
| 2005/0084006 A1 | 4/2005 | Lei |
| 2005/0123171 A1 | 6/2005 | Kobayashi et al. |
| 2005/0169553 A1 | 8/2005 | Maurer |
| 2005/0185711 A1 | 8/2005 | Pfister |
| 2005/0190180 A1 | 9/2005 | Jin et al. |
| 2005/0270367 A1 | 12/2005 | McDowall |
| 2006/0001596 A1 | 1/2006 | Cuffaro et al. |
| 2006/0046846 A1 | 3/2006 | Hashimoto |
| 2006/0109200 A1 | 5/2006 | Alden |
| 2006/0136846 A1 | 6/2006 | Im et al. |
| 2006/0139312 A1 | 6/2006 | Sinclair et al. |
| 2006/0161410 A1 | 7/2006 | Hamatani et al. |
| 2006/0200518 A1 | 9/2006 | Sinclair et al. |
| 2006/0203085 A1 | 9/2006 | Tomita |
| 2006/0252978 A1 | 11/2006 | Vesely |
| 2006/0274197 A1 | 12/2006 | Yoo |
| 2007/0039032 A1 | 2/2007 | Goldey et al. |
| 2007/0052672 A1 | 3/2007 | Ritter et al. |
| 2007/0153122 A1 | 7/2007 | Ayite |
| 2007/0171275 A1 | 7/2007 | Kenoyer |
| 2007/0242068 A1 | 10/2007 | Han |
| 2007/0263003 A1 | 11/2007 | Ko |
| 2007/0266412 A1 | 11/2007 | Trowbridge |
| 2007/0296721 A1 | 12/2007 | Chang et al. |
| 2008/0015997 A1 | 1/2008 | Moroney et al. |
| 2008/0024454 A1 | 1/2008 | Everest |
| 2008/0044079 A1 | 2/2008 | Chao et al. |
| 2008/0052759 A1 | 2/2008 | Kronlund et al. |
| 2008/0062125 A1 | 3/2008 | Kitaura |
| 2008/0080852 A1 | 4/2008 | Chen |
| 2008/0100547 A1 | 5/2008 | Cernasov |
| 2008/0151092 A1 | 6/2008 | Vilcovsky et al. |
| 2008/0199070 A1 | 8/2008 | Kim et al. |
| 2008/0247610 A1 | 10/2008 | Tsunoda |
| 2008/0247670 A1 | 10/2008 | Tam et al. |
| 2008/0256572 A1 | 10/2008 | Chen |
| 2008/0303896 A1 | 12/2008 | Lipton et al. |
| 2008/0310499 A1 | 12/2008 | Kim |
| 2009/0033737 A1 | 2/2009 | Goose et al. |
| 2009/0046895 A1 | 2/2009 | Pettersson et al. |
| 2009/0096858 A1 | 4/2009 | Jeong et al. |
| 2009/0100474 A1 | 4/2009 | Migos |
| 2009/0122134 A1 | 5/2009 | Joung et al. |
| 2009/0128620 A1 | 5/2009 | Lipton et al. |
| 2009/0160934 A1 | 6/2009 | Hendrickson et al. |
| 2009/0174708 A1 | 7/2009 | Yoda et al. |
| 2009/0221368 A1 | 9/2009 | Yen et al. |
| 2009/0278917 A1 | 11/2009 | Dobbins et al. |
| 2009/0310851 A1 | 12/2009 | Arcas et al. |
| 2009/0315977 A1 | 12/2009 | Jung |
| 2009/0319178 A1 | 12/2009 | Khosravy |
| 2009/0327418 A1 | 12/2009 | Zhang et al. |
| 2010/0007582 A1 | 1/2010 | Zalewski et al. |
| 2010/0013738 A1 | 1/2010 | Covannon |
| 2010/0026783 A1 | 2/2010 | Chiu et al. |
| 2010/0031202 A1 | 2/2010 | Morris et al. |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085416 A1 | 4/2010 | Hegde et al. |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0103822 A1* | 4/2010 | Montwill ........... H04L 41/0645 370/242 |
| 2010/0114783 A1 | 5/2010 | Spolar |
| 2010/0134411 A1 | 6/2010 | Tsumura |
| 2010/0150523 A1 | 6/2010 | Okubo |
| 2010/0171697 A1 | 7/2010 | Son et al. |
| 2010/0171814 A1 | 7/2010 | Routhier et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0235871 A1 | 9/2010 | Kossin |
| 2010/0238273 A1 | 9/2010 | Luisi et al. |
| 2010/0241999 A1 | 9/2010 | Russ et al. |
| 2010/0303442 A1 | 12/2010 | Newton et al. |
| 2010/0306800 A1 | 12/2010 | Jung et al. |
| 2010/0309287 A1 | 12/2010 | Rodriguez |
| 2010/0315494 A1 | 12/2010 | Ha et al. |
| 2011/0001806 A1 | 1/2011 | Nakahata |
| 2011/0012896 A1 | 1/2011 | Ji |
| 2011/0012992 A1 | 1/2011 | Luthra |

(56) References Cited

U.S. PATENT DOCUMENTS

| | | |
|---|---|---|
| 2011/0019669 A1* | 1/2011 | Ma .................... H04L 45/00 370/389 |
| 2011/0029893 A1 | 2/2011 | Roberts et al. |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0085017 A1 | 4/2011 | Robinson et al. |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn |
| 2011/0122220 A1 | 5/2011 | Roberts et al. |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1 | 7/2011 | Fortin et al. |
| 2011/0164122 A1 | 7/2011 | Hardacker |
| 2011/0187821 A1 | 8/2011 | Routhier et al. |
| 2011/0193946 A1 | 8/2011 | Apitz |
| 2011/0199469 A1 | 8/2011 | Gallagher |
| 2011/0211049 A1 | 9/2011 | Bassali et al. |
| 2011/0221874 A1 | 9/2011 | Oh |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1 | 10/2011 | Fahrny et al. |
| 2011/0267422 A1 | 11/2011 | Garcia et al. |
| 2011/0267437 A1 | 11/2011 | Abeloe |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1* | 12/2011 | Shuster .................... G06T 17/00 700/264 |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050456 A1* | 3/2012 | Arnao .................... H04N 7/152 348/14.12 |
| 2012/0050507 A1 | 3/2012 | Keys |
| 2012/0075407 A1 | 3/2012 | Wessling et al. |
| 2012/0092445 A1 | 4/2012 | McDowell et al. |
| 2012/0169730 A1 | 7/2012 | Inoue |
| 2012/0169838 A1 | 7/2012 | Sekine |
| 2012/0206558 A1 | 8/2012 | Setton et al. |
| 2012/0212509 A1 | 8/2012 | Benko et al. |
| 2012/0249719 A1 | 10/2012 | Lemmey et al. |
| 2012/0249741 A1 | 10/2012 | Maciocci et al. |
| 2012/0274731 A1 | 11/2012 | Shanmukhadas et al. |
| 2012/0327174 A1 | 12/2012 | Hines et al. |
| 2013/0070045 A1 | 3/2013 | Meek et al. |
| 2013/0120522 A1 | 5/2013 | Lian et al. |
| 2013/0271560 A1 | 10/2013 | Diao et al. |
| 2016/0243442 A1 | 8/2016 | Friedman |
| 2016/0269722 A1 | 9/2016 | King et al. |
| 2016/0309117 A1 | 10/2016 | Hines |
| 2016/0323546 A1 | 11/2016 | Hines |
| 2016/0344976 A1 | 11/2016 | Hines et al. |

* cited by examiner

200

300

APPARATUS AND METHOD FOR PROVIDING MEDIA CONTENT

CROSS-REFERENCE TO RELATED APPLICATIONS

This application is a continuation of U.S. application Ser. No. 14/682,690, filed Apr. 9, 2015, which is a continuation of U.S. application Ser. No. 13/173,310, filed Jun. 30, 2011 (now U.S. Pat. No. 9,030,522), which are incorporated herein by reference in their entirety.

FIELD OF THE DISCLOSURE

The present disclosure relates generally to communication and more specifically to an apparatus and method for providing media content.

BACKGROUND

Media consumption has become a multibillion dollar industry that continues to grow rapidly. High resolution displays such as high definition televisions and high resolution computer monitors can present two-dimensional movies and games with three-dimensional perspective Improvements in display, audio, and communication technologies are causing rapid demand for consumption of all types of media content. Individuals often desire to share their experiences, including experiences with respect to media consumption, products and services. The sharing of these experiences is often limited by the capabilities of communication devices being utilized for messaging and the like. The sharing of these experiences is often limited by factors that are independent of the communication devices.

DETAILED DESCRIPTION

Figure 1:
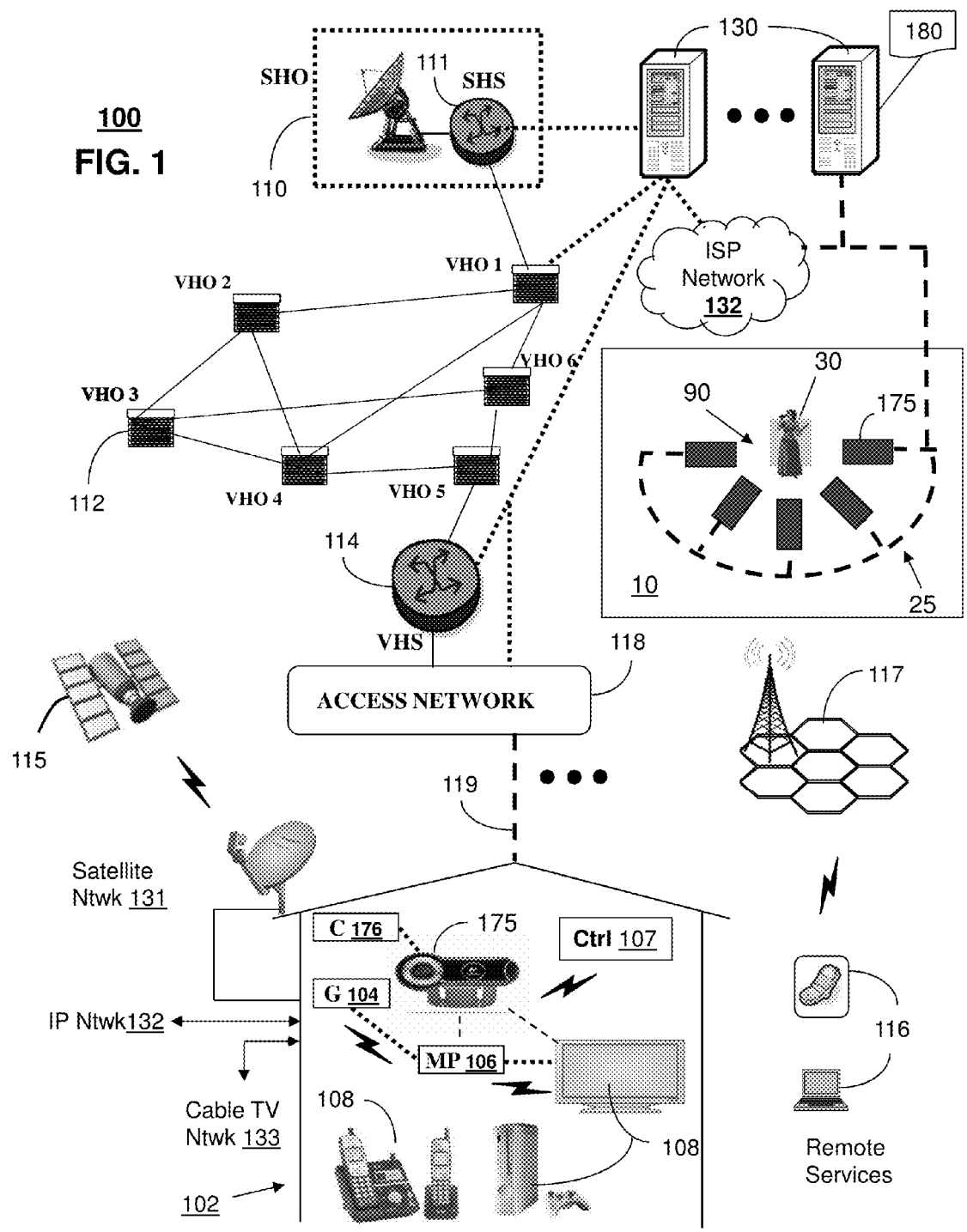
FIG. 1 depicts an illustrative embodiment of a communication system that provides media services with telepresence.

This application is related to co-pending U.S. application Ser. No. 13/173,281 filed Jun. 30, 2011, entitled "APPARATUS AND METHOD FOR MANAGING TELEPRESENCE SESSIONS" by Hines et al., U.S. application Ser. No. 13/168,539 filed Jun. 24, 2011, entitled "APPARATUS AND METHOD FOR PRESENTING MEDIA CONTENT WITH TELEPRESENCE" by Hines et al.; and U.S. application Ser. No. 13/168,549 filed on Jun. 24, 2011, entitled "APPARATUS AND METHOD FOR PRESENTING THREE DIMENSIONAL OBJECTS WITH TELEPRESENCE" by Hines et al. The contents of each of the foregoing are hereby incorporated by reference into this application as if set forth herein in full.

The present disclosure describes, among other things, illustrative embodiments of methods and devices for providing a user with media content of an event that simulates the user being present at the event. The media content can be presented as three dimensional (3D) content. The user can establish communication session(s) with other user(s) that are presented in conjunction with the media content to simulate the user and other user(s) being present at the event. In one or more embodiments, the media content can be captured by fixed cameras (e.g., 3D cameras) at the event and users can share the media content captured by the fixed cameras. In one or more embodiments, the media content can be captured by a group of cameras (e.g., 3D cameras) at the event where the group of cameras is moveable for adjusting the field of view, and where media content from each camera is provided to different users. In one or more embodiments, the moveable cameras can be adjusted based on detected motion of the user viewing the media content.

In one or more embodiments, the 3D content can be generated by a remote server and/or can be generated by media processors, such as through use of a depth map. In one or more embodiments, images of a user can be rotated or otherwise repositioned during presentation in response to detecting speech of the user to further enhance telepresence by simulating the user facing another user to speak. Other embodiments are also can included.

One embodiment of the present disclosure can include a server that includes a memory and a controller coupled to the memory. The controller can be adapted to receive a first request for a first telepresence seat at an event where the first request is associated with a first processor at a first location of a first user and to receive a second request for a second telepresence seat at the event where the second request is associated with a second processor at a second location of a second user. The controller can be adapted to obtain media content comprising event images of the event that are captured by an event camera system and to receive first images that are captured by a first camera system at the first location. The controller can be adapted to receive second images that are captured by a second camera system at the second location. In response to the first request, the controller can provide the media content and second video content representative of the second images to the first processor for presentation at a first display device utilizing a first telepresence configuration that simulates the first and second users being present at the event. In response to the second request, the controller can provide the media content and first video content representative of the first images to the second processor for presentation at a second display device utilizing a second telepresence configuration that simulates the first and second users being present at the event. The providing of the first and second video content can involve establishing a communication session between the first and second users. The media content, the first video content and the second video content can be adapted for presentation as three dimensional content.

One embodiment of the present disclosure can include a method that includes receiving media content at a first media processor of a first location associated with a first user, where the media content comprises event images of an event that are captured by an event camera system, and where the event camera system comprises a group of three dimensional cameras. The media content can be received from a first three dimensional camera of the group of three dimensional cameras without the first media processor receiving other media content captured by remaining three dimensional cameras of the group of three dimensional cameras. The method can include presenting the media content as three dimensional content at a first display device of the first location and detecting a movement of the first user. In response to detecting the movement, a movement signal can be transmitted to the first three dimensional camera for moving the first three dimensional camera to adjust a viewing field of the first three dimensional camera.

One embodiment of the present disclosure can include a non-transitory computer-readable storage medium that includes computer instructions. The instructions can enable obtaining media content at a server, where the media content comprises event images of an event that are captured by an event camera system, and where the event camera system comprises a group of three dimensional cameras. The computer instructions can enable determining position information for each camera of the group of three dimensional cameras relative to the event and determining operational information for each camera of the group of three dimensional cameras. The operational information can include movement capability to adjust a viewing field. The computer instructions can enable presenting an offer for access to the media content to at least one consumer, where a price associated with the offer is based on the position and operational information.

FIG. 1 depicts an illustrative embodiment of a first communication system 100 for delivering media content, which can include 3D media content. System 100 provides a user with media content of an event that simulates the user being present at the event. The media content can be presented as 3D or holographic content. The media content can be captured by fixed cameras (e.g., 3D cameras) at the event and users can share the media content captured by the fixed cameras. The media content can also be captured by a group of cameras (e.g., 3D cameras) at the event where the group of cameras is moveable for adjusting the field of view, and where media content from each camera is provided to different users.

The communication system 100 can represent an Internet Protocol Television (IPTV) broadcast media system although other media broadcast systems can be used with the present disclosure. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as computers, Set-Top Boxes (STBs) or gaming consoles which in turn present broadcast channels to display devices 108 such as television sets or holographic display devices, managed in some instances by a media controller 107 (such as an infrared or RF remote control, gaming controller, etc.).

The gateway 104, the media processors 106, and/or the display devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130, where a portion of these computing devices can operate as a web server for providing portal services over an Internet Service Provider (ISP) network 132 to media processors 106, wireline display devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, and so on).

A satellite broadcast television system can be used in conjunction with, or in place of, the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the display devices 108. The media processors 106 can be equipped with a broadband port to the IP network 132 to enable services such as VoD and EPG described above.

In yet another embodiment, an analog or digital broadcast distribution system such as cable TV system 133 can be used in place of or in conjunction with the IPTV media system described above. In this embodiment the cable TV system 133 can provide Internet, telephony, and interactive media services.

The present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

System 100 can provide 3D content to the building 102 for presentation and/or can provide 2D content that can be rendered into 3D content by one or more client devices, such as the media processor 106 or the TV 108. The 3D image content can be based upon various 3D imaging techniques, including polarization, anaglyphics, active shuttering (such as alternate frame sequencing), autostereoscopy, and so forth. The present disclosure can include presentation of all or a portion of a display in 3D, including utilizing devices that do not require a wearable viewing apparatus (e.g., does not require active shuttering glasses).

In one embodiment, system 100 can include one or more image capturing devices 175 (e.g. a camera) that can capture 2D and/or 3D images of a user and/or other objects at the building 102. Other components can be utilized in combination with or in place of the camera 175, such as a scanner (e.g., a laser system that detects object circumference), distance detector, and so forth. In one embodiment, camera 175 can be a group of cameras, such as two or more cameras for providing different viewing angles and/or for providing a holographic image. In one embodiment, the camera 175 can capture images in 2D which are processed into 3D content, such as by media processor 106 and/or computing device 130. In one embodiment, depth maps can be utilized to generate 3D content from 2D images. In another embodiment, the camera 175 can be a stereoscopic camera that directly captures 3D images, such as through use of multiple lenses. A collector 176 or other component can facilitate the processing and/or transmission of the captured images. The collector 176 can be a stand-alone device, such as in communication with the media processor 106 and/or the gateway 104 (e.g., wirelessly and/or hardwired communication) or can be integrated with another device, such as the media processor 106.

Computing device 130 can also include computer readable storage medium 180 having computer instructions for establishing a telepresence communication session with an event 10 and/or between client devices (e.g., media processor 106). The event 10 can be any type of occurrence that can be recorded, such as a performance, a sporting event, a debate, and so forth. In one embodiment, the event 10 is an occurrence that gathers an audience of live viewers, such as a football game or a concert where tickets to attend the event are sold.

The computing device 130 can provide media content representative of the event 10 to a number of different users at different locations, such as a user at building 102, via the telepresence communication session. Computing device 130 can provide the media content in a telepresence configuration that simulates users being present at the event 10. For instance, the telepresence configuration can display an object 30 (e.g. a singer) of the media content and can further display each of the other users to simulate them being a part of the audience at the event 10. In one embodiment, the particular telepresence configuration can be adjusted by one or more of the users based on user preferences, such as retrieved from a user profile or determined from monitored viewing behavior.

The computing device 130 can be coupled with a camera system 25 that is positioned at the event location to capture event images, such as in a field of view 90. The camera system 25 can include a number of different components, such as cameras 175, which can be three dimensional cameras, and which can be fixed and/or moveable cameras. In one embodiment, movement signals can be transmitted from the computing device 130 to a camera 175 of the camera system 25 to adjust the field of view 90. In one embodiment, the movement signals can be generated in response to receipt of control signals generated from detection of user movement at building 102. For example, a user can move in a particular direction, rotation and so forth which results in one of the cameras 175 adjusting its field of view 90. The adjustment of the field of view 90 allows the user to view various portions of the event 10, including at different viewing angles.

In one or more embodiments, the storage medium 180 can include computer instructions for determining a latency area of the access network 118 and can configure routes for the telepresence session based on the latency area, such as avoiding use of one or more network elements of the latency area. In one or more embodiments, the storage medium 180 can include computer instructions for determining a delay to inject or otherwise provide to the delivery and/or presentation of the telepresence configuration to select locations in order to synchronize the telepresence sessions among locations. For example, the computing device 130 can delay delivery of the video content and/or the media content (e.g., a unicast or multicast of the media content) to a number of locations so that those locations can be synchronized with another location that is experiencing latency.

In one or more embodiments, the media content and/or the images of the users, or a portion thereof, can be presented as 3D content to enhance the telepresence. For example, the 3D content can be generated by computing device 130 and/or can be generated by media processor 106, such as through use of a depth map in combination with the corresponding images. System 100 can include other components to enhance the telepresence experience. For instance, lighting and audio components can be utilized to facilitate capturing the images and audio from a user. The lighting and/or audio components can be controlled by the media processor 106 and/or by the computing device 130. User preferences and/or monitored behavior can be utilized in controlling the lighting and/or audio components.

In one embodiment, the users can be part of a social network and the computing device 130 can be in communication with a social network application, such as for selecting the media content to be provided in the telepresence configuration. In one embodiment, the telepresence configuration, including providing the media content and the video content of each of the users, can be performed without using the computing device 130 to generate the video content from captured images or to combine the media and video content. In one example, the telepresence configuration can be generated by the media processors 106 and distributed through a peer-to-peer technique, where the media processors share the video content amongst themselves and obtain the media content from one of the media processors or from another source, such as media content being broadcast. In one embodiment, each of the media processors 106 of the different users can be in a master-slave arrangement to control presentation of the media content and facilitate generating the telepresence configuration.

System 100 enables video and/or audio content of the users to be provided to the other users in real-time to establish a communication session while simulating the co-location of the users at the event and providing telepresence with the media content.

Figure 2:
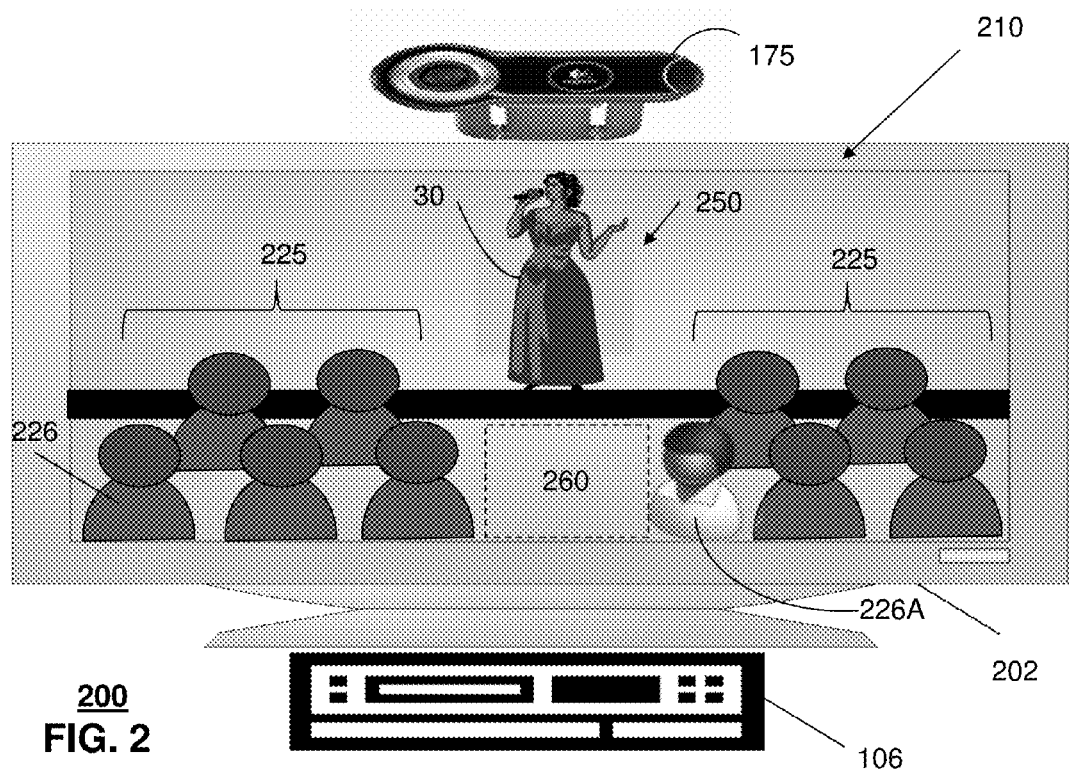
FIG. 2 depicts an illustrative embodiment of a presentation device and media processor for presenting media content that can be used in the system of FIG. 1.

FIG. 2 depicts an illustrative embodiment of a presentation device 202 and the media processor 106 for presenting a telepresence configuration 210 that can include video content 225 which is captured images of users that are at different locations from where the presentation device 202 is located. The users can be associated with each other, such as through a group purchase of access to the media content 250. A portion or all of the users can also be unrelated, similar to audience members who would attend the event 10.

The telepresence configuration 210 also includes the media content 250, such as captured from event 10 of FIG.

1. The telepresence configuration 210 can simulate the users being present at the event 10 through use of the video content 225. The simulation can be performed in a number of different ways, including presenting the other users in the images as if they were viewing the media content 250. The simulation can be facilitated by the positioning of the camera 175 and/or by post-capture processing, such as adjusting the video content 225 so that the other users appear as being rotated towards the media content 250. Other simulation effects can be utilized. For example, the images in the video content 225 can be re-sized, including based on the particular size of the presentation device 202, to further simulate the other users being present at the location of the presentation device 202. The media content 250 and/or video content 225 of one or more users can be provided for presentation in the telepresence configuration 210 in 3D.

In one embodiment, the video content 225 comprises telepresence seats 226 that are representative of the remote users that are receiving the telepresence configurations 210 at the different locations. In this example, each of the telepresence seats or a portion thereof can have a different viewing angle of the object 30 at event 10 (FIG. 1) which is being presented in the media content 250. In one embodiment, the telepresence seats 226 can be sold on an individual basis such that only one telepresence seat 226 is sold per person resulting in all of the users at the different locations having different viewing angles of the object 30.

In one embodiment, a viewing area 260 can be provided to the user so that the media content 250 is more easily seen. The viewing area can be an area that is directly in front of the user if the user where actually present at the event 10. In one embodiment, telepresence seats in viewing area 260 can be provided to other users (including providing the media content 250 at the particular viewing angle) but those telepresence seats in the viewing area are removed or otherwise not presented in the video content 225 so as not to obstruct the view of the user.

In one embodiment, the user who has been assigned to telepresence seat 226A is shown facing away from the object 30. This technique can be utilized for facilitating communication between users who are in telepresence seats 226 that are close to each other. For example, the user at telepresence seat 226A may desire to speak with the user receiving the telepresence configuration 210 in system 200. Speech detection or other techniques can be utilized to initiate adjusting the video content 225 in this example.

One or both of the presentation device 202 and the media processor 106 can include the camera 175 that captures images of the user that are provided to the other users in their telepresence configuration 210. The camera 175 can capture 2D images and/or can capture 3D images. The camera 175 can be a group of cameras to capture multiple views, including views to construct a holographic image, such as of the user and/or of objects associated with the user. In one embodiment, the presentation device 202 can be a holographic display device that presents all or a portion of the telepresence configuration 210 as holographic content. The holographic content can allow a viewer's perspective on a depicted object to change as the viewer moves around the hologram content, just as it would if the object were real.

In the present illustration, the presentation device 202 is depicted as a television set. It will be appreciated that the presentation device 202 can represent a portable communication device such as a cellular phone, a PDA, a computer, or other computing device with the ability to display media content. The media processor 106 can be an STB, or some other computing device such as a cellular phone, computer, gaming console, or other device that can process and direct the presentation device 202 to present images associated with media content 250 and/or the video content 225. It is further noted that the media processor 106 and the presentation device 202 can be an integral unit. For example, a computer or cellular phone having computing and display resources collectively can represent the combination of a presentation device 202 and media processor 106.

Figure 3:
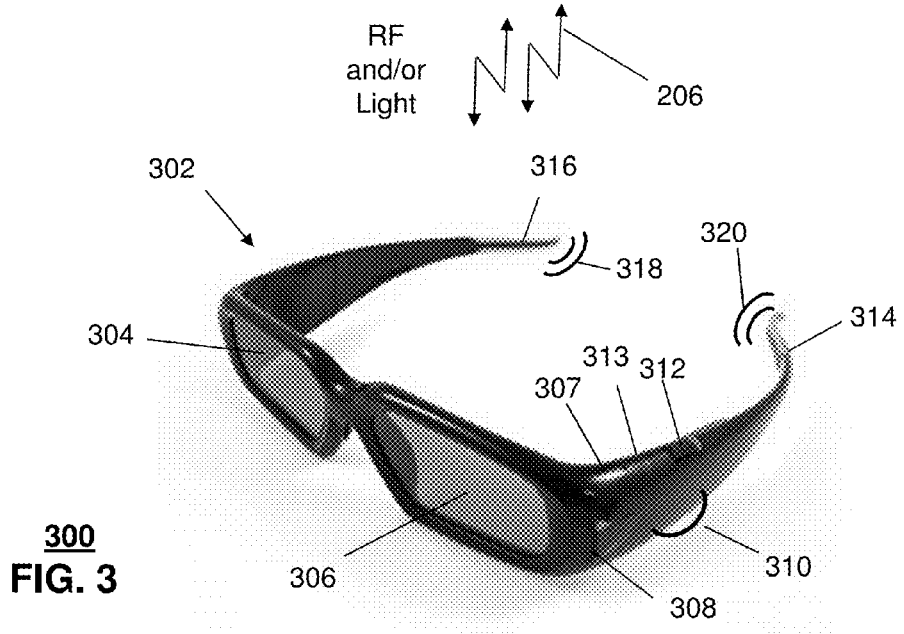
FIG. 3 depicts an illustrative embodiment of a viewing apparatus that can be used with the presentation device of FIG. 2.

The media processor 106 can be adapted to communicate with accessories such as the viewing apparatus 300 of FIG. 3 by way of a wired or wireless interface, such as through RF and/or light waves 206. The communication can be one-way and/or two-way communication, such as providing the viewing apparatus 300 with a transceiver 302. A wired interface can represent a tethered connection from the viewing apparatus 300 to an interface of the media processor (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 300 can be used by the presented disclosure.

The viewing apparatus 300 can represent an apparatus for viewing two-dimensional and/or 3D stereoscopic images which can be still or moving images. The viewing apparatus 300 can be an active shutter viewing apparatus. In this embodiment, each lens has a liquid crystal layer which can be darkened or made to be transparent by the application of one or more bias voltages. Each lens 304, 306 can be independently controlled. Accordingly, the darkening of the lenses can alternate, or can be controlled to operate simultaneously.

Each viewing apparatus 300 can include various components associated with a communication device including a wireline and/or wireless transceiver 302 (herein transceiver 302), a user interface (UI), a power supply, a location detector, and a controller 307 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI can include a depressible or touch-sensitive keypad with a navigation mechanism such as a roller ball, joystick, mouse, or navigation disk for manipulating operations of the communication device 300. The keypad can be an integral part of a housing assembly of the apparatus 300 or an independent device operably coupled thereto by a tethered wireline interface (such as a USB cable) or a wireless interface supporting for example Bluetooth. The keypad can represent a numeric dialing keypad commonly used by phones, and/or a Qwerty keypad with alphanumeric keys. The UI can further include a display such as monochrome or color LCD (Liquid Crystal Display), OLED (Organic Light Emitting Diode) or other suitable display technology for conveying images to an end user of the apparatus 300. In an embodiment where the display is touch-sensitive, a portion or all of the keypad 308 can be presented by way of the display.

The UI can also include an audio system 312 that utilizes common audio technology for conveying low volume audio (such as audio heard only in the proximity of a human ear) and high volume audio for hands free operation. The audio system 312 can further include a microphone for receiving audible signals of an end user. The audio system 312 can also be used for voice recognition applications. The UI can further include an image sensor such as a charged coupled device (CCD) camera for capturing still or moving images.

The power supply can utilize common power management technologies such as replaceable and rechargeable batteries, supply regulation technologies, and charging system technologies for supplying energy to the components of the apparatus 300 to facilitate long-range or short-range portable applications. The location detector can utilize common location technology such as a global positioning system (GPS) receiver for identifying a location of the communication device 300 based on signals generated by a constellation of GPS satellites, thereby facilitating common location services such as navigation.

The transceiver 302 can also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

In one embodiment, the viewing apparatus 300 can utilize a receiver portion of the transceiver 302 in the form of an infrared. Alternatively, the viewing apparatus 300 can function as a two-way communication device, in which case a full infrared transceiver could be utilize to exchange signals between the media processor 106 and the viewing apparatus 300.

The viewing apparatus 300 can utilize a controller 307 to control operations thereof, and a portable power supply (not shown). The viewing apparatus 300 can have portions of a UI. For example, the viewing apparatus 300 can have a multi-purpose button 312 which can function as a power on/off button and as a channel selection button. A power on/off feature can be implemented by a long-duration depression of button 312 which can toggle from an on state to an off state and vice-versa. Fast depressions of button 312 can be used for channel navigation. Alternatively, two buttons can be added to the viewing apparatus 300 for up/down channel selection, which operate independent of the on/off power button 312. In another embodiment, a thumbwheel can be used for scrolling between channels.

The viewing apparatus 300 can also include an audio system 313 with one or more speakers in the extensions of the housing assembly such as shown by references 314, 316 to produce localized audio 318, 320 near a user's ears. Different portions of the housing assembly can be used to produce mono, stereo, or surround sound effects. Ear cups (not shown) such as those used in headphones can be used by the viewing apparatus 300 (as an accessory or integral component) for a more direct and low-noise audio presentation technique. The volume of sound presented by the speakers 314, 316 can be controlled by a thumbwheel 310 (or up/down buttons—not shown).

It would be evident from the above descriptions that many embodiments of the viewing apparatus 300 are possible, all of which can be used with the present disclosure. In one embodiment, the viewing apparatus 300 can be utilized as part of the image capture process. For instance, the transceiver 302 can function to transmit a locator and/or calibration request that is wirelessly emitted for receipt by the camera(s) 175 or another processing device, such as the media processor 106. The emitted signal can be position information that is utilized to facilitate capturing images of a target, including adjusting the positioning and focus of the camera(s) 175 to capture the user and/or another object. In one embodiment, the viewing apparatus 300 can be used to detect movement of the user for generating commands to control movement of a camera 175 at the event 10 (e.g., three dimensional cameras of camera system 25) in order to adjust the field of view of the camera at the event.

In one embodiment, the presentation device 202 can present holographic content that enables different perspectives of a user and/or object to be viewed depending on the position of the viewer. The holographic content can be all or a portion of the telepresence configuration 210, such as only the media content 250 or only one or more of the video content 225. As an example, the presentation device 202 can utilize active shuttering where different perspectives of an image are presented during different time slots which can be synchronized with the viewing apparatus 300. The particular perspective of an image can be viewed via the active shuttering of the viewing apparatus 300 based on the position of the viewer, such as detected from the viewing apparatus. An example of this is described in U.S. application Ser. No. 12/839,943 filed on Jul. 20, 2010, the disclosure of which is hereby incorporated by reference in its entirety. Other techniques and components are can be used for presenting holographic content at the presentation device 202, including with or without a viewing apparatus 300.

In one embodiment, the images of the user(s) in video content 225 can be modified, including change of clothing, environment and/or appearance. For example, the images of the other users can be presented but without the viewing apparatus 300 being worn. For instance, other images of the other users, such as in user profiles, can be utilized to modify the images to fill in pixels where the viewing apparatus 300 was removed. In another example, the modification of the images of the video content 225 can be based on the media content 250, such as the images of the other users being presented but wearing a cowboy hat where the media content is a rodeo. The modifications to the video content 225 can be based on a number of different factors, such as user preferences, and can be controlled by various entities, such as allowing a user to retain control over any modifications to the presentation of their own images and/or allowing a user to control any modification to the presentation of other users.

Figure 4:
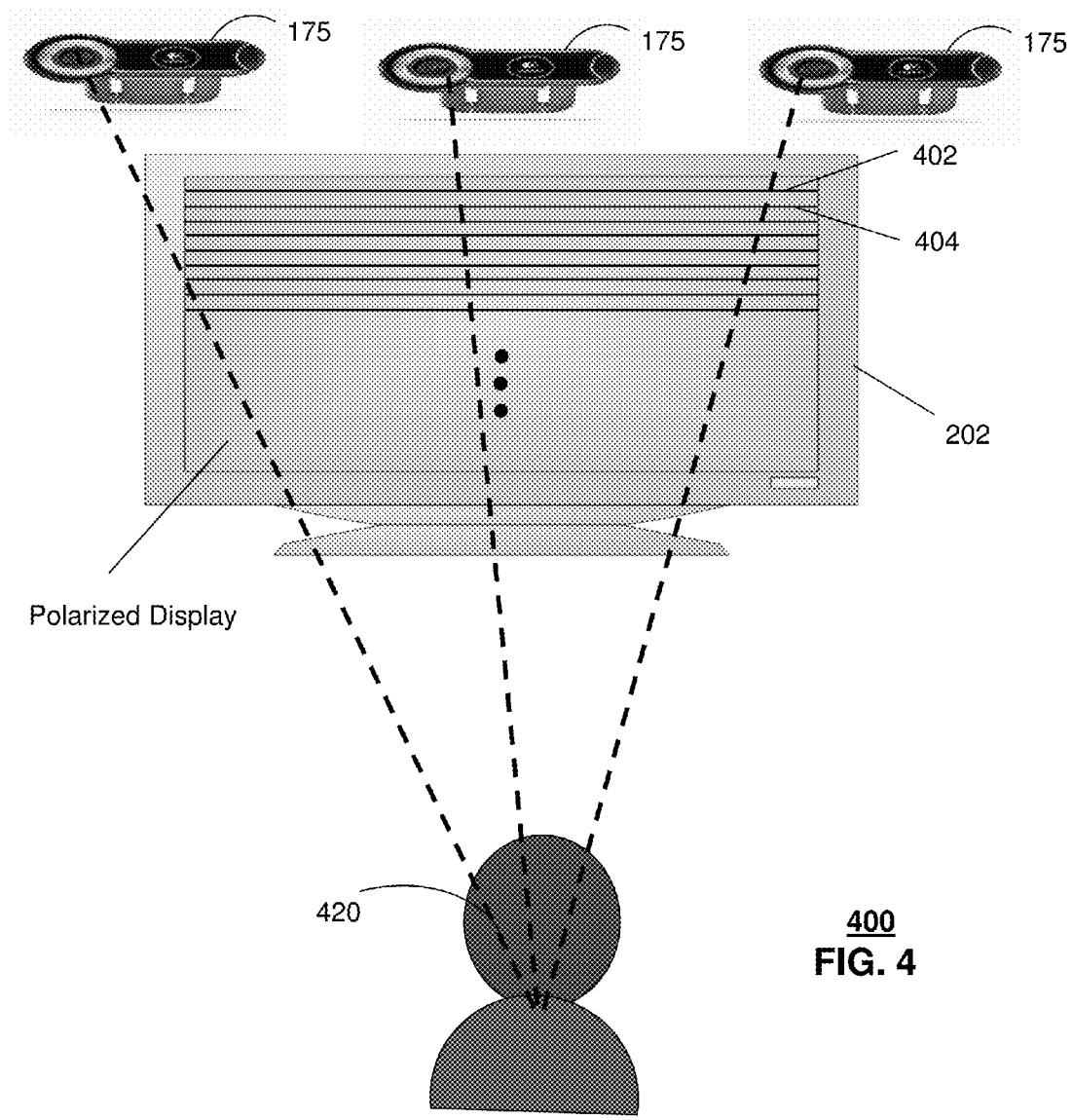
FIG. 4 depicts an illustrative embodiment of a presentation device with a polarized display that can be used in the system of FIG. 1.

FIG. 4 depicts an illustrative embodiment of a presentation device 402 with a polarized display. A display can be polarized with polarization filter technology so that alternative horizontal pixel rows can be made to have differing polarizations. For instance, odd horizontal pixels 402 can be polarized for viewing with one polarization filter, while even horizontal pixels 404 can be polarized for viewing with an alternative polarization filter. The viewing apparatus 300 previously described can be adapted to have one lens polarized for odd pixel rows, while the other lens is polarized for viewing even pixel rows. With polarized lenses, the viewing apparatus 300 can present a user a 3D stereoscopic image. The telepresence configuration 210 of FIG. 2 can be presented utilizing the presentation device 402.

System 400 illustrates use of multiple cameras 175 for capturing images of user 420 from different perspectives or views. The different perspective images can then be utilized for generating a 3D representation of the user 420. The particular number and positioning of the cameras 175 can vary. In one embodiment, one of the cameras 175 can be a depth or distance camera that is utilized for generating a depth map associated with the user 420 so that the depth map and images captured by the other cameras can be used in constructing the 3D representation of the user 420.

Figure 5:
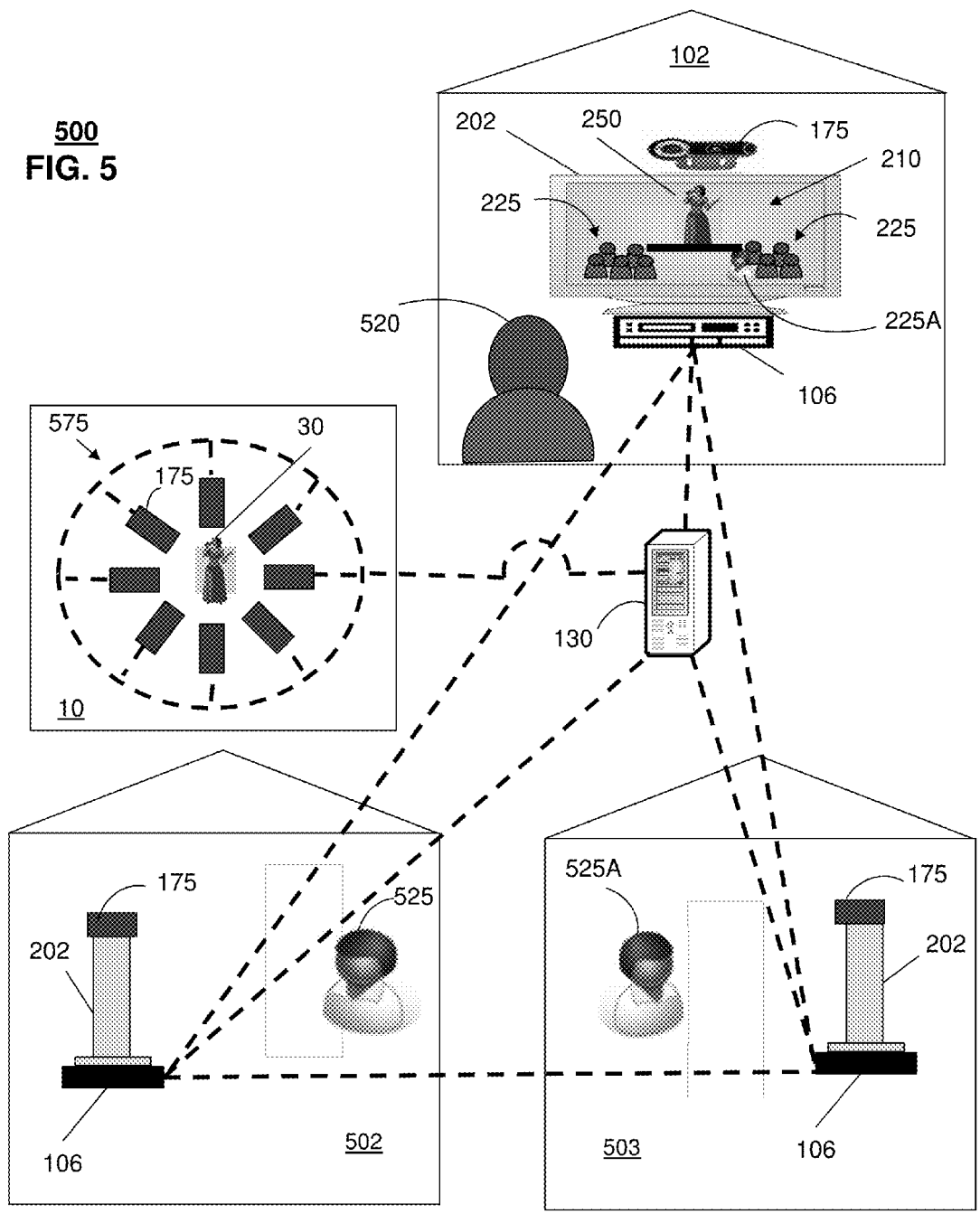
FIGS. 5-7 depict illustrative embodiments of communication systems that provide media services with telepresence.

FIG. 5 depicts an illustrative embodiment of a communication system 500 that can provide the telepresence configuration 210 to a plurality of locations 102, 502 and 503. While three locations are illustrated in system 500, the present disclosure can have two or more locations being utilized. The telepresence configuration 210 for each of the locations 102, 502 and 503 includes the media content 250 and includes video content 225 for the other users. For example, a user 520 at location 102 is provided with video content 225 that includes other users 525, 525A at locations 502 and 503, as well as a number of other users at other locations (not shown) arranged in audience seating.

The computing device 130 can be utilized to provide the telepresence configuration 210 to each of the locations 102, 502, 503, such as through receiving captured images of each of the users 520, 525 and 525A, and distributing the video content 225 and the media content 250 to each of the locations. As an example, each of the media processors 106 can then present the video content 225 and the media content 250, such as simulating the users being in seats in the audience. The particular configuration can depend on the venue of the event 10. For example, if the venue is a small theatre for a concert then a limited number of rows can be provided at eye level with the object 30 where as if the venue is a stadium for a football game then rows of seats can be presented that look down at the playing field.

In one embodiment, the captured images and the media content 250 can be combined by the computing device 130 into single content that is provided to the locations 102, 502 and 503, such as through a multicast, without the need for further arranging the media and video content. In one embodiment, separate or a combined stream of the media content 250 and the video content(s) 225 can be provided to each media processor 106 for combining into the telepresence configuration 210.

In one embodiment, the media processor 106 can instruct the users 520, 525 and 525A to sit or otherwise position themselves where they will be watching the telepresence configuration 210. A position of the user can then be determined for adjusting the camera 175 at each of the locations 102, 502, 503. A distance to the viewer can be determined, such as through use of time-of-flight, stereo triangulation, sheet of light triangulation, structured light, interferometry, coded aperture, and so forth. Other components can also be utilized to facilitate the process, including a depth camera integrated with camera 175 or provided as a stand-alone component.

System 500 can utilize a camera system 575 at event 10 to capture the images of object 30 that are presented in media content 250. Camera system 575 can include a number of fixed cameras 175, such as three dimensional cameras. In one embodiment, images captured by the cameras 175 can provide different perspectives or viewing angles of the object 30. System 500 allows multiple users to share images from the same camera or cameras. Users can be provided with different viewing angles and/or can share the same viewing angle of the object 30. The particular number and configuration of the cameras 175 of camera system 575 can vary based on a number of factors, including the venue of the event 10. As an example, in a theatre with lower and upper seating, the cameras can be arranged between the upper and lower levels. As another example, the cameras 175 of the camera system 575 at a stadium can be arranged as a camera bank in front of stadium seating, but so as not to obstruct the view of the stadium seating.

In this example, user 525A at location 503 is speaking with user 520 at location 102. To facilitate the communication, a portion 225A of the video content can be adjusted so that user 525A presented at presentation device 202 of location 102 is turned to face the user 520 at the location 102. In one embodiment, user 520 can mute or otherwise prevent the other users in the video content 225 from communicating with him or her, such as preventing the exchange of audio signals and/or preventing user 525A from facing user 520 in the video content 225. The muting can be performed remotely by the computing device 130 and/or can be performed locally by the media processor 106 of location 102. The muting can be performed selectively, such as user 520 designating particular users that are to be muted and allowing others to communicate with user 520. The muting can also be performed while allowing the presentation of the media content 250, including video and audio, to continue.

Figure 6:
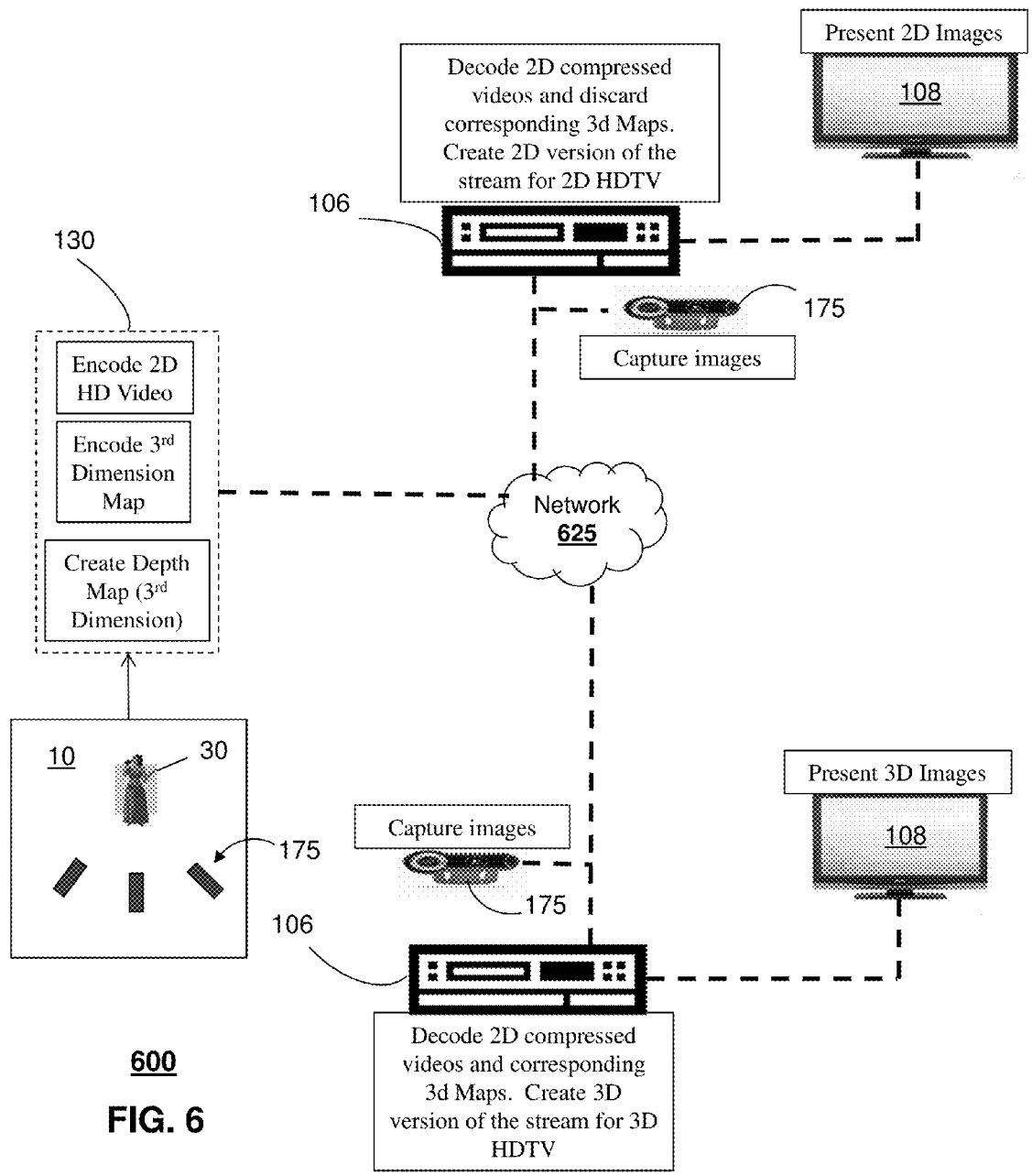

FIG. 6 depicts an illustrative embodiment of another communication system 600 that can present the telepresence configuration 210 at display devices 108 of different users at different locations via a telepresence communication session. System 600 can be overlaid or operably coupled with the devices and systems of FIGS. 1-5 to receive media content 250 and/or video content 225, which is presentable as 3D content. In one embodiment, computing device 130 can receive 2D media content from the cameras 175 at event 10 and can generate (or otherwise obtain) a depth map associated with the media content, such as based on object segmentation. The computing device 130 can encode the media content and depth map (such as into a single video stream in H.264 format encapsulated in an MPEG-2 wrapper) and transmit the media content and depth map to one or more media processors 106, such as through broadcast, multicast and/or unicast utilizing network 625. In one embodiment, the computing device 130 can generate the depth map in real-time or near real-time upon receipt of the 2D media content, such as from a broadcast studio. The computing device 130 can also generate a depth map for video content that is captured by the cameras 175 in 2D.

System 600 includes media processors 106 which receive the video stream of the 2D media and video content and the corresponding depth maps. The media processors 106 can generate 3D content using the depth maps in real time upon receipt of the video stream. The media processors 106 can also detect the capability of display devices (such as through HDMI 1.4a) and can adjust the media content accordingly. For instance, if a display device 108 can only present 2D content, then the media processor 106 may discard the depth map and provide the 2D content to the display device. Otherwise, the media processor 106 can perform the real-time generation of the 3D content using the depth map and provide the content to the 3D capable display device 108. The conversion into 3D content from the depth map(s) can be based upon various imaging techniques and the 3D presentation in the telepresence configuration 210 can be based upon various formats including polarization, anaglyphics, active shuttering (such as alternate frame sequencing), autostereoscopy, and so forth.

In one embodiment, position information associated with one or more viewers can be utilized to adjust 3D media content, such as adjusting a convergence of the media content 250 and/or video content 225 based on a distance of the viewer(s) from the display device 108. Calibration can also be performed using a number of components and/or techniques, including a distance camera to measure distances and/or image camera 175 for capturing images of the viewers which can be used for interpolating distances.

System 600 has the flexibility to selectively provide 2D content and 3D content to different locations. System 600 further has the flexibility to selectively provide a combination of 2D and 3D content for presentation in the telepresence configuration 210 (FIG. 2). For example, a user may desire to watch the media content 250 in 3D while viewing the video content 225 in 2D. The selection of 2D or 3D presentation can be based on a number of factors, including device capability and type of content. The selection can be made by a number of different entities, including the users via the media processors 106 and/or by the service provider via computing device 130. The selection of 2D or 3D can also be made by one or more devices of system 600 without user intervention based on a number of factors, such as device capability, network status, viewing history, and so forth.

Figure 7:
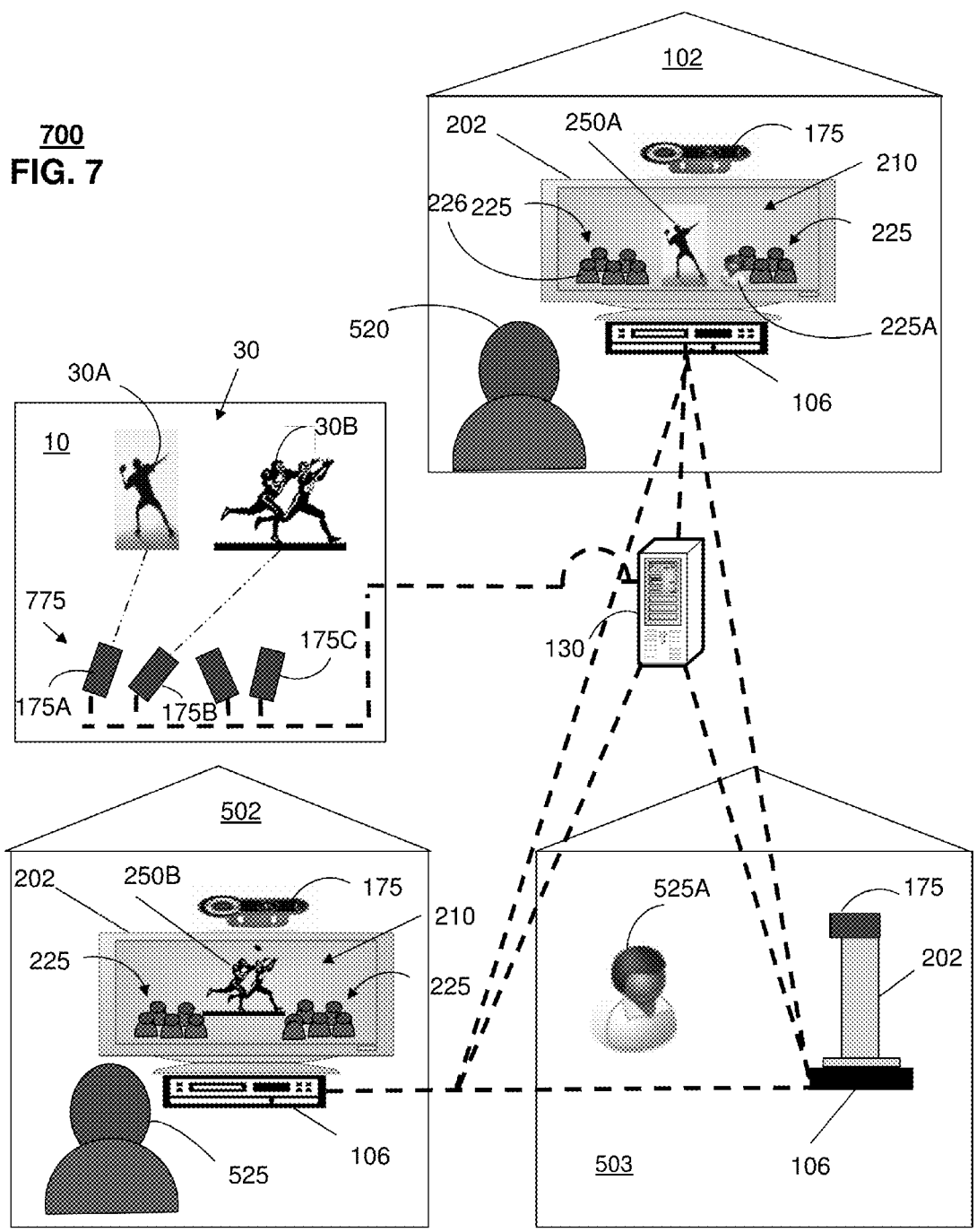

FIG. 7 depicts an illustrative embodiment of another communication system 700 that can present a telepresence configuration 210 at presentation devices 202 of different users at different locations 102, 502, 503 via a telepresence communication session. System 700 can be overlaid or operably coupled with the devices and systems of FIGS. 1-6 to receive media content and/or video content which is presentable as 2D content, and/or 3D or holographic content. System 700 can include components similar to that of system 600, such as the media processor 106, the presentation device 202, the computing device 130 and the cameras 175. The presentation device can be various types of display devices including televisions, holographic display devices, volumetric display devices, and so forth.

While three locations are illustrated in system 700, the present disclosure can have two or more locations being utilized. The telepresence configuration 210 for each of the locations 102, 502 and 503 can include media content 250 and can include video content 225. For example, a user 520 at location 102 can be provided with video content 225 that includes users 525, 525A at locations 502, 503, as well as other users at other locations (not shown) that are accessing the media content. The computing device 130 can be utilized to provide the telepresence 210 to each of the locations 102, 502, 503, such as through receiving captured images of each of the users 520, 525 and 525A and distributing the video content 225 and the media content 250 to each of the locations. As an example, each of the media processors 106 can then present the video content 225 and the media content 250, such as in an arrangement simulating the users 520, 525 and 525A being present at the event 10, which can include positioning the video content 225 as if the users 525, 525A were sitting in the audience at the event 10 viewing the media content 250. To facilitate the communication, a portion 225A of the video content can be adjusted so that user 525A presented at presentation device 202 of location 102 is turned to face the user 520 at the location 102.

In one embodiment, the captured images of the users (e.g., video content 225) and the media content 250 can be combined by the computing device 130 into single content that is provided to the locations 102, 502 and 503, such as through a multicast, without the need for further arranging the object and video content. In one embodiment, separate or a combined stream of the media content 250 and the video content(s) 225 can be provided to each media processor 106 for combining into the telepresence configuration 210.

The media content 250 can be generated based on images captured by a camera system 775 that includes a group of cameras 175 that are moveable or otherwise adjustable to change the viewing field of each of the cameras. The group of cameras 175 can be positioned to capture different viewing angles for the object 30 which in this example is football players in a football game (i.e., event 10). The images can then be processed into the media content 250 by generating 3D images from 2D images for the object 30 and/or capturing 3D images using 3D stereoscopic cameras. Various 3D techniques and components can be utilized, including polarization, anaglyphics, active shuttering (such as alternate frame sequencing), autostereoscopy, and so forth.

In one embodiment, one or more of the cameras 175 can be independently controlled with respect to the other cameras of camera system 775. For example, camera 175A and camera 175B can each be 3D cameras that capture 3D images. Camera 175A and camera 175B can be controlled independently of each other and independently of the remaining cameras of camera system 775. Camera 175A can be moved or otherwise adjusted so that its viewing field focuses on quarterback 30 of the object 30. Camera 175A can capture images that are used for generating media content 250A that is provided to user 520 at location 102. Camera 175B can be moved or otherwise adjusted so that its viewing field focuses on receiver 30B of the object 30. Camera 175B can capture images that are used for generating media content 250B that is provided to user 525 at location 502. Both media receivers 106 at locations 102, 502 receive media content captured from event 10, but the users are provided the flexibility to view different portions of the object 30, similar to the experience of an individual who is in the stadium watching the football game.

The movement or adjustment of the viewing field for the cameras 175 can be performed in a number of different ways based on a number of different techniques. In one embodiment, movement of a user can be detected and the camera 175 can be adjusted based on the detected movement. For instance, if it is detected that a user rotates his or her head to the right then the viewing filed can be shifted to the right. In one embodiment, the change in the viewing field can be performed based on relative movement. For example, a rotation of the user's head from a centered position to a right-facing position can cause the viewing field to shift to the right and allow portions of the object 30 (e.g., receivers 30B) to appear in the center of the media content 250. Rotation of the user's head back to the centered position can be detected as the user focuses on the receivers 30B that are being presented, but this movement may not cause the viewing field to be adjusted. If the user rotates his or head from the centered position to a left-facing position then the viewing field can be adjusted to shift to the left which allows portions of the object 30 (e.g., quarterback 30A) to appear in the center of the media content 250. Rotation of the user's head back to the centered position can be detected as the user focuses on the quarterback 30A that are being presented, but this movement may not cause the viewing field to be adjusted.

Other methods for adjusting the viewing field can be used by the present disclosure. For example, gestures of the user can be detected (e.g., hand motion) and the viewing field of camera 175 can be adjusted based on the particular gesture. The re-positioning of the cameras 175 can be performed in a number of different ways, such as pivoting cameras, sliding cameras on a track (e.g., a circular or annular track), and so forth. In one embodiment, the re-positioning of the cameras 175 can be performed automatically based on actuation of motors (e.g., electric servo-motors) coupled with the cameras that can adjust the position of the camera.

Various methods and components can be utilized for detecting user movement. In one embodiment, apparatus 300 of FIG. 3 can be used to detect user movement, such as head rotation via communication between the apparatus 300 and the media processor 106 or a separate motion detection device. Image recognition, user illumination with a light source, determination of light travel distance associated with the user, generating a depth map for the user and other techniques can also be used. Gyroscopes, accelerometers and other position detection devices, such as in the apparatus 300, can also be utilized for detecting movement of the user. The present disclosure can include detecting user movement with or without the apparatus 300, such as based on a positioned detector embedded in the media processor 106 or a separate device coupled with the media processor that can detect user movement, including through illuminating the user with a light source.

Control signals or commands can be generated, such as by the media processor 106, based on the detected movement. The control signals can be transmitted to the computing device 130 and/or directly to the corresponding camera of camera system 775 for moving the camera to adjust its viewing field. In one embodiment, the control signals can be received by the computing device from the media processor 106. The computing device 130 can generate a motion signal or command which is provided to the camera system 775 to initiate the camera adjustment. The computing device 130 can analyze the received control signal to determine if the camera is capable of the particular motion and/or to determine if the control signal is a legitimate signal for adjusting the camera. For example, if the detected movement is a 90 degree rotation of the user's head which would mean the user was not viewing his or her presentation device then the computing device 130 can determine that the camera should not be adjusted. The computing device can use various techniques for determining legitimate control signals, such as based on movement thresholds, movement speed, and/or monitored movement of the user (e.g., stored in a user profile). The computing device 130 can also provide a translation to detected movement in the control signal. For instance, the detected movement can be a 30 degree rotation of the user's head which the computing device 130 can translate into a proportional angular adjustment (e.g. 45 degrees) of the viewing field due to the potential viewing area of the event 10.

In one embodiment, media content 250 generated from the images captured by each camera 175 of the camera system 775 can be separately provided to different user so that there is no sharing of images from the camera system 775 between the users. In this example, users can purchase a telepresence seat 226 which has a camera (e.g., camera 175A) assigned for the telepresence seat. Only the user who purchased that telepresence seat 226 will have access to the media content 250 that is generated from the images captured by the particular camera 175. The user will further have the flexibility of manipulating the viewing field of the camera 175.

In one embodiment, the generated media content 250 is 3D content that is holographic content. The holographic content provides different viewing perspectives of the object 30 based on viewer position in reference to a display device. The media content 250 can be generated in whole or in part by various devices in system 700, such as computing device 130 and/or media processor 106. In one embodiment, the selection of a device to perform the generation of the media content 250 or a portion thereof can be based on load-balancing. For instance, local devices such as media processor 106 of location 503 can generate all or a portion of the media content 250 when a desired amount of processing resources are available for the local media processor 106. However, if a desired amount of processing resources are not available for the local media processor 106 at location 503 then other devices, such as one or more of the other media processors at locations 102 and 502 and the computing device 130 can generate the media content 250.

In one embodiment, a plurality of formats can be generated for the media content 250. The different formats can be based on the capabilities of the media processors 106 and/or the presentation devices 202. For instance, holographic content may be generated for the media processor 106 if it is determined that the presentation device 202 at location 102 is a holographic display device or otherwise has the ability to present holographic images, while 3D content based on active shuttering can be generated for the media processor 106 of location 502 if it is determined that capabilities at location 502 warrant this format. In one embodiment, the selection and generation of the format of the media content 250 can be based on capability determinations being made by the devices of system 700, such as the computing device 130 querying the local devices for display capabilities and/or accessing user profiles or past history information to make the determination. In one embodiment, each of the various formats can be generated without regard to device capabilities and a selection can then be made of the corresponding format to be transmitted.

Figure 8:
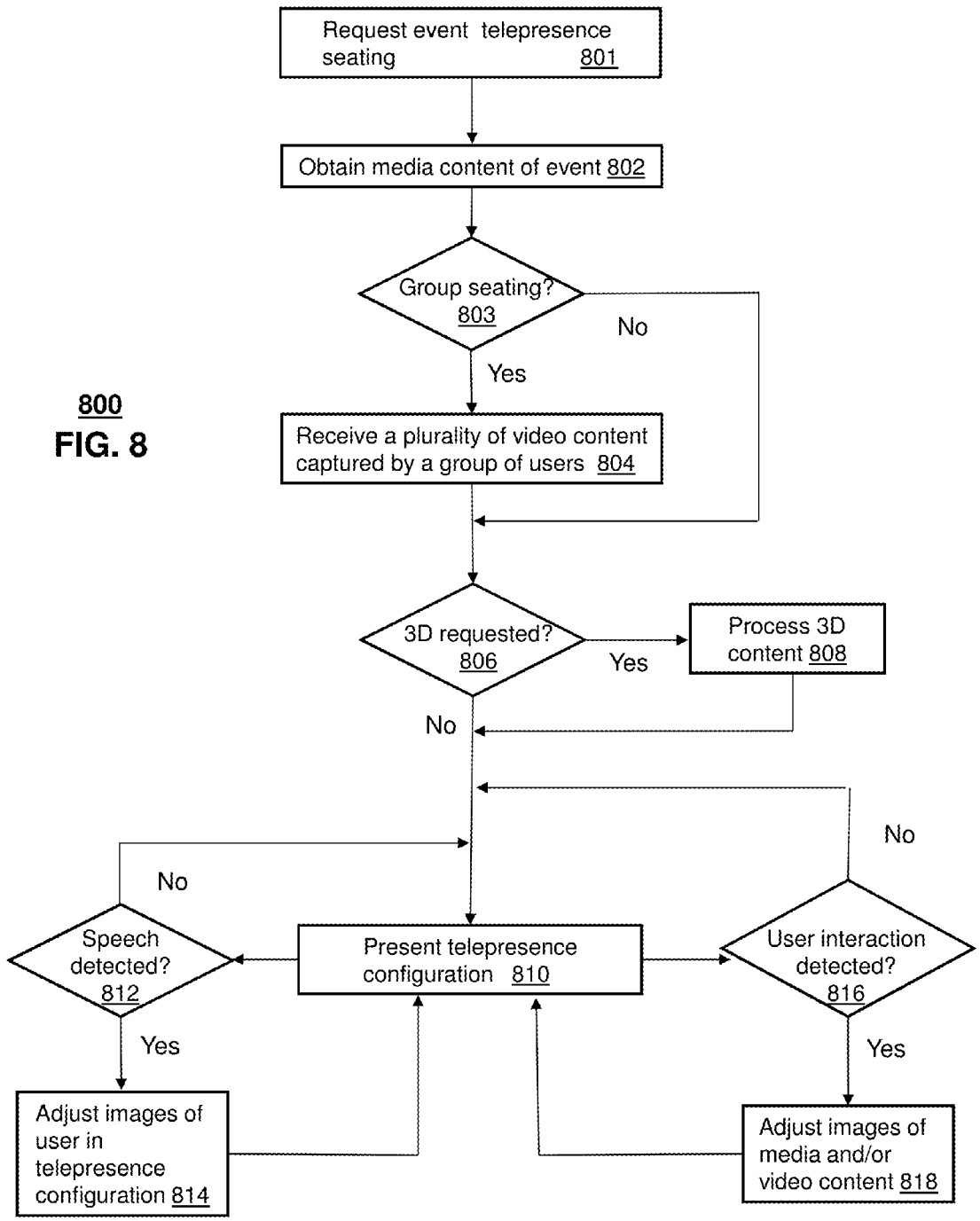
FIG. 8 depicts an illustrative embodiment of a method operating in portions of the devices and systems of FIGS. 1-7.

FIG. 8 depicts an illustrative embodiment of a method 800 operating in portions of the devices and systems described herein and/or illustrated in FIGS. 1-7. Method 800 can begin with step 801 in which a request for event telepresence seating is received. The request can be received in a number of different ways, such as through a social network application or in response to an offer for a telepresence seat. The offer can be made at anytime, including after seats at the event are no longer available. In one embodiment, the price associated with the offer can be based on various factors. For example, position information relative to the event can be determined for each camera used to capture images of the event. Operational information for each camera can be determined such as whether the camera is a fixed camera or is capable Of adjusting its viewing field (e.g., a moveable camera). The offer for telepresence seating for the event can be based on the position and/or operational information.

At step 802 the media content 250 can be obtained, such as through transmission over a network from a camera system at the event. The media content 250 can be received as 2D content and converted to 3D content and/or can be received as 3D content. The media content 250 can be received by the computing device 130 (e.g., a centralized distribution process) and/or received by one or more of the media processors 106 (e.g., a distributed or master-slave process). It should be understood that the present disclosure can include the media processor 106 being various types of devices, including personal computers, set top boxes, smart phones and so forth. The media content 250 can be generated from cameras, such as 3D cameras, where the images are shared among two or more users (e.g., fixed cameras at the event) or where there is no sharing of images, such as where a user has purchased a telepresence seat that is associated with a camera that has an adjustable viewing field. Combinations of fixed and adjustable cameras can also be utilized so that a portion of the users are sharing some images while another portion of the users are not sharing their images.

At step 803, it can be determined if the event includes group seating, such as in an audience and whether other users have obtained access to the media content 250 and thus have a telepresence seat at the event. If there is group seating then at step 804, video content 225 can be received from a plurality of different media receivers 106 at different locations. The video content 225 can be received as part of a communication session established between media processors 106 of each of the different users. Each of the video content 225 can be received as 2D content and converted to 3D content and/or can be received as 3D content. Each of the video content 225 can be received by the computing device 130 (e.g., a centralized distribution process) and/or received by one or more of the media processors 106 (e.g., a distributed or master-slave process). The video content 225 can be captured by one or more cameras 175 at each location, where the cameras are 2D and/or 3D cameras. Other components can also be used to facilitate capturing the video content 225, including lighting components and/or audio components, which can be controlled locally and/or remotely (e.g., by the computing device 130 or a master media processor 106).

At step 806, it can be determined if 3D content has been requested or is otherwise desired. For instance, a user profile associated with each user at each location can be accessed by the computing device 130 and/or one or more of the media processors 106 to determine if 3D content is desired for the media content 250 and/or video content 225. If 3D content is desired then at step 808 the content can be processed accordingly. For example, if the content received is in 3D format, such as from a 3D content at the event or at a user location, then a determination can be made if the format is compatible with the media processors 106 and adjusted accordingly. For instance, content can be adjusted to be compatible with a first media processor 106 and a copy of the content can be further adjusted to be compatible with a second media processor. If the content is in 2D format then the content can be converted to 3D format, such as through use of a depth map or using other techniques.

At step 810, the media content 250 and the video content 225 can be presented at each display device of each location in a telepresence configuration, such as configuration 210 of FIG. 2 and/or FIG. 7. The telepresence configuration can simulate each of the users being co-located at the event. In one embodiment, the telepresence configurations can be adjustable, such as by the user selecting the configuration. The adjustments to the telepresence configuration can include size, resolution, and so forth.

In one embodiment at step 812, the computing device 130 and/or the media processor 106 can monitor to detect speech of a user at one of the locations. If speech is detected from a target user, then at step 814 the video content can be adjusted (e.g., by the computing device 130 and/or the media processor 106) to further simulate the target user speaking to the one or more of the other users, such as an adjacent user in the telepresence seating. This simulation can include depicting the target user or a portion thereof (e.g., the user's head) turning to face the viewer of the display device to speak with them. In one embodiment, the telepresence configuration can provide images of the rear of the other user's head's as if they were watching the media content and then present the face of the target user when the target user is speaking. In one embodiment, images of a front of a user's head can be used to generate video content depicting the back of the user's head, such as through determining shape, circumference, hair color and so forth.

In one embodiment, a user can select other users to be muted or with whom communication is to be permitted. The muting can be performed in a number of different ways and by different components, including the computing device 130 and/or the media processors 106. For example, the muting can be performed by preventing audio signals from a "speaking" user to be presented at a user's location who has muted the other user. The muting can be performed while allowing the media content 250 to continue to be presented both through video and audio.

In one embodiment at step 816, user interaction (including user movement) can be detected or otherwise determined, such as by one of the media processors 106 and/or the computing device 130. The user interaction can be based on detected movement of the user, including rotation of the user's head. The user interaction can also be based on user inputs at a user interface at one of the locations. At step 818, the media content 250 can be adjusted in response to the user interaction. The adjustment can be performed in a number of different ways, including based on utilizing different images with different viewing angles, adjusting the cameras 175 of camera system 775 to provide for different perspective or viewing field, and/or extrapolating views based on the captured images.

Figure 9:
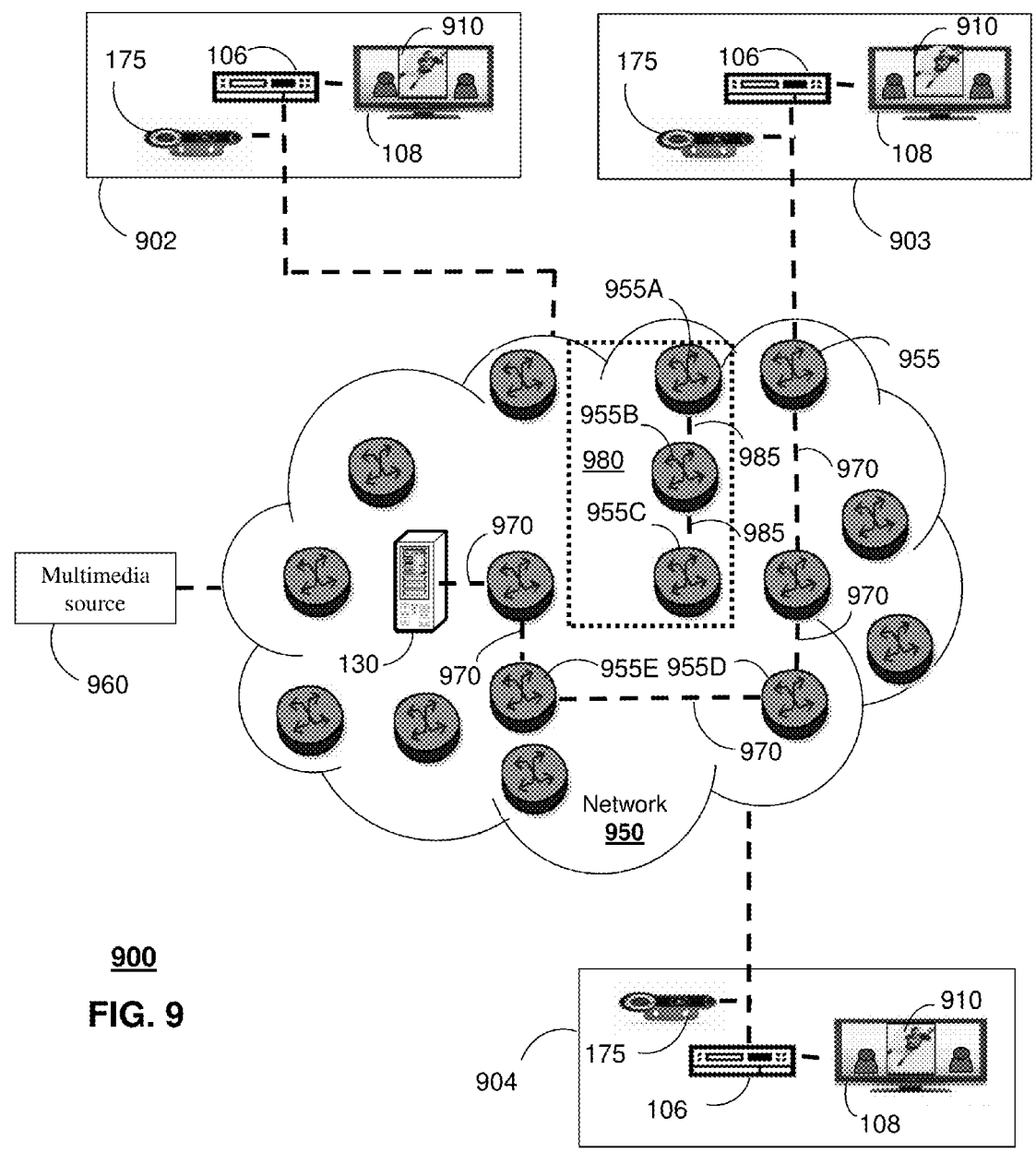
FIG. 9 depicts an illustrative embodiment of a communication system that provides media services with telepresence.

FIG. 9 depicts an illustrative embodiment of another communication system 900 that can present a telepresence configuration 910 at presentation devices 108 of different users at different locations 902, 903, 904 via a telepresence communication session. System 900 can be overlaid or operably coupled with the devices, systems and methods of FIGS. 1-8 to receive media content and/or video content in the telepresence configuration 910. The media content and/or video content (e.g., media content 250 and video content 225 of FIG. 2) can be presented as 3D or holographic content. System 900 can include components similar to that of system 600, such as the media processor 106, the computing device 130 and the cameras 175. The presentation devices 108 can be various types of display devices including televisions, holographic display devices, volumetric display devices, and so forth. The cameras 175 can be various types of devices, including 2D and 3D cameras and can be any number and configuration of cameras, including system 775 of FIG. 7. While three locations are illustrated in system 900, the present disclosure can include two or more locations being utilized.

The media processors 106 of the locations 902, 903, 904 can communicate with each other and/or with the computing device 130 over a network 950 that includes network elements 955. The network elements 955 can be various devices utilized for providing communication, including routers, switches, servers, DSLAMs, and so forth. The number and configuration of the network elements 955 can vary. A multimedia source 960, such as camera system 775 a the event 10 of FIG. 7 can be utilized for sourcing the media content to the media processors 106 of the locations 902, 903, 904, including via the computing device 130.

System 900 can provide for latency testing to be performed with respect to the media processors 106 of the locations 902, 903, 904, as well as with respect to the network elements 955 that could be used for providing the telepresence sessions between these locations. The type of latency testing performed can vary. For example, loopback testing can be performed by the computing device 130 to each of the media processors 106 of the locations 902, 903, 904 and/or to the source 960. The loopback testing can also be originated from devices other than the computing device 130, such as from the media processors 106 of one or more of the locations 902, 903, 904 and/or from one or more network elements 955, such as along a potential route of the telepresence session. In one embodiment, multiple loopback tests can be originated from multiple devices along potential routes of the telepresence session. The results of this group of loopback tests can be utilized to isolate particular network elements 955 that are experiencing latency.

The use of other latency testing techniques can be used by the present disclosure for isolating network elements 955 experiencing latency, including periodically or otherwise gathering latency parameters associated with all or a portion of the network elements 955 of the network 950. The latency parameters can be analyzed for determining particular network elements 955 experiencing latency. It should be understood that the latency can be caused by various factors, including workload, faults, on-going maintenance, and so forth. In one or more embodiments, the methodology and/or the components used to determine which network elements 955 of the network 950 are experiencing latency can be selected based on a known or predicted cause of the latency.

In one embodiment, when one or more network elements 955 of the network 950 are determined to be experiencing latency, then a latency area 980 can be determined or otherwise defined for the network 950. The latency area 950 can be determined based on the isolated network elements 955 experiencing the latency, as well as a known topology of the network 950. For example, the latency area 980 of FIG. 9 depicts three network elements 955A, 955B, 955C. In this example, network elements 955A and 955C have been determined to be experiencing latency while no such determination has been made with respect to network element 955B. However, the network element 955B has been included in the latency area 980 because, based on the network topology, it has been determined that routing 985 between network element 955A and network element 955C would be done through network element 955B.

In one or more embodiments, the routes for the telepresence session can be configured or otherwise determined based on the latency area 980. For example, routes can be configured to avoid all or a portion of the network elements 955 in the latency area 980. The configuration of the routes can be performed by a number of different devices (e.g. the computing device 130) and can be performed in a centralized or distributed fashion (e.g., using a group of computing devices 130 positioned in different parts of the network 950).

In one or more embodiments, dedicated routes can be utilized for the telepresence sessions. For example, heavy users of telepresence sessions and/or users that have obtained a service upgrade may be provided with dedicated routes using select network elements 955 that are intended to reduce latency in the transmission and/or receipt of the telepresence session signals. In one or more embodiments, the select network elements 955 of the dedicated routes can be dedicated devices that are used only for telepresence sessions and/or for limited functions that include telepresence sessions. In one or more embodiments, the select network elements 955 of the dedicated routes can be devices (dedicated devices and/or non-dedicated devices) that are known to have lower latency, such as due to lower workloads, higher processing resources, and so forth.

Continuing with the example set forth in system 900, one dedicated route 970 is illustrated between media processor 106 of location 903 and the computing device 130. This example illustrates the locations 902 and 904 utilizing non-dedicated routes through the network 950. The number and configuration of dedicated routes can vary, including providing all or only a portion of the media processors 106 of the locations 902, 903, 904 with dedicated routes to and from the computing device 130. Other dedicated routes can also be utilized, such as where data is being exchanged with other devices, such as routes directly between media processors 106 of the locations 902, 903, 904 without routing to the computing device 130.

In one or more embodiments, the latency area 980 can be utilized for reconfiguring the dedicated route 970. For instance, the dedicated route 970 might normally include network element 955C. But, since network element 955C has been determined to be part of latency area 980, the dedicated route 970 can be re-configured to avoid use of network element 955C through re-routing to network element 955D and to network element 955E.

System 900 also provides for injecting delay into the presentation of one or more of the telepresence configurations 910, including portions of the telepresence configuration, such as the media content. As an example, a determination can be made as to which of the locations 902, 903, 904 are experiencing the largest latency in presentation of the media content and/or the video content in the telepresence configuration. One or more delay time periods can be determined based on this latency and a delay(s) can be injected into presentation of the telepresence configuration for the other locations. The delay(s) can be applied to both the media content and the video content or can be separately applied, including use of different delay periods for the media content and the video content. By delaying the presentation of the other devices by the delay time(s) associated with the location experiencing the most latency, system 900 can provide a synchronized presentation of the telepresence configuration. The delay(s) can be injected by the computing device 130, such as by delaying delivery of the media content to locations 902, 903 when location 904 is experiencing the largest latency for the media content. The delay(s) can also be injected by the media processors 106 at select locations, including based on a delay period calculated by the computing device 130 for the other location and transmitted to the media processors, when presenting the telepresence configuration 910 at the display devices 108 of the select locations.

Figure 10:
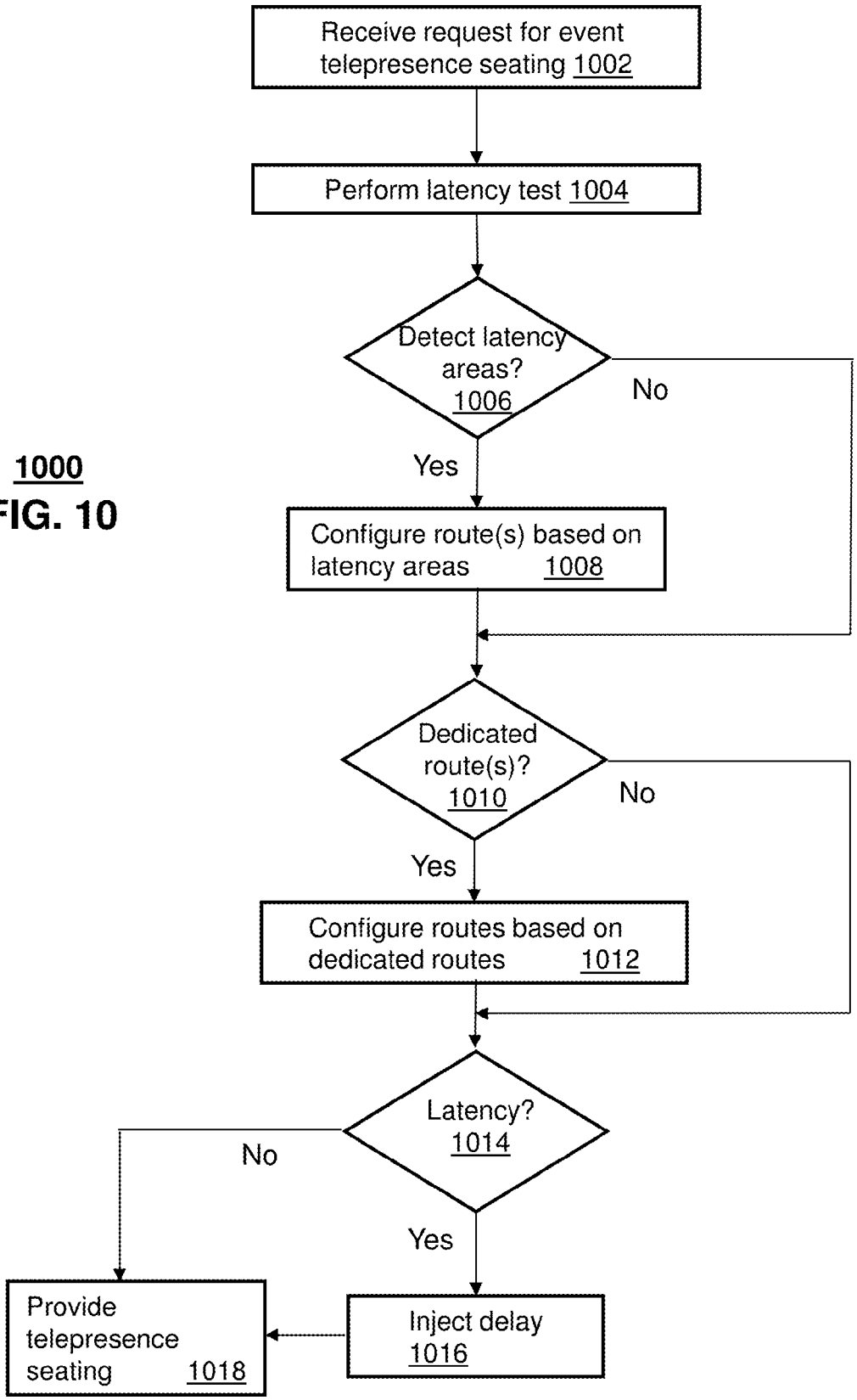
FIG. 10 depicts an illustrative embodiment of a method operating in portions of the devices, systems and/or methods of FIGS. 1-9.

FIG. 10 depicts an illustrative embodiment of a method 1000 operating in portions of the devices, systems and/or methods described herein and/or illustrated in FIGS. 1-9. Method 1000 can begin with step 1002 in which a request for an event telepresence seating is received. The request can be received at various devices, depending on how the telepresence session is being managed. For example, in system 900 of FIG. 9, the telepresence session request can be received by computing device 130 from one or more of the media processors 106 at locations 902, 903, 904. In one embodiment, the telepresence session request can be received in conjunction with a social network application.

In step 1004, latency testing can be performed for network elements that could potentially deliver signals for the telepresence session (i.e., the element is part of a possible route for the telepresence session). The type of latency testing can vary and can include loopback testing, such as from the computing device 130 to each of the media processors 106 at locations 902, 903, 904. The latency testing can be performed between other devices of the network, including between network elements in order to isolate select network elements that are experiencing latency issues. The latency testing can be performed at various times. For example, latency testing can be performed in response to receiving the request for the telepresence session and/or can be performed at other times, such as periodically. Other types of latency testing can be used by the present disclosure, including gathering packet latency telemetry from all or a portion of the network elements.

In step 1006, a latency area can be detected or otherwise determined based on the results of the latency testing. The latency area can include network elements experiencing latency issues. The latency area can further include other network elements that have not been determined to be experiencing latency issues but due to their position in proximity to those network elements, they are included in the latency area. In step 1008, routes for the telepresence session can be configured based on the latency areas. For example, routes can be configured to avoid all or a portion of the network elements in the latency area.

In step 1010, it can be determined whether any of the users, such as at locations 902, 903, 904, have dedicated routes. For example, a user may have a service plan that includes dedicated routes for telepresence sessions. In one or more embodiments, service plan upgrades can be offered in response to a request for a telepresence session. In one or more embodiments, usage of telepresence sessions by a user can be monitored to generate a history for the user. The history can be compared to a usage threshold to determine if a dedicated route should be provided to the user for the telepresence session.

If the user is permitted to utilize a dedicated route then in step 1012 the route can be re-configured based on the dedicated route. It should be further understood that the sequence of the steps of method 1000 can be changed. For example, dedicated routes can first be determined and then the dedicated routes can be altered when the dedicated route passes through, or otherwise relies upon, a network element of the latency area. If on the other hand, there are no dedicated routes then method 1000 proceeds to step 1014 to determine if latency issues still exist.

If there are no latency issues remaining or if the latency issues are within acceptable tolerances then in step 1018 the telepresence session can be provided. If on the other hand, there are latency issues outside of acceptable tolerances then in step 1016 a delay can be injected into the presentation of the telepresence configuration at a portion of the locations. For example, a determination can be made as to which location is experiencing the greatest latency and a delay period can be calculated based on that latency. A local delay can be injected, such as the other media processors 106 at the other locations delaying presentation of the media content and/or the video content to synchronize the telepresence configurations at each location. The present disclosure can also use a remote delay, such as the computing device 130 delaying providing the media content and/or the video content to a portion of the locations based on a calculated delay period.

In one embodiment, the delay period can be based on a difference in latency between the different locations. For example, a first location may present an image at a 20 ms relative mark, while a second location presents the same image at a 40 ms relative mark and a third location presents the same image at a 60 ms relative mark. A first delay period can be calculated for the first location to be 40 ms based on the delay difference between the first and third location. A second delay period can be calculated for the second location to be 20 ms based on the delay difference between the second and third location. No delay would be provided to the third location in this example. The method 1000 can proceed to step 1018 to provide the telepresence session.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for methods 800 and 1000.

In one embodiment, the adjusting of the viewing field of the camera can be performed without movement of the camera. For example, the camera can have a wide viewing field where only a portion of the viewing field is presented in the media content at any given time. Shifting the viewing field to the left or right, as well as up or down, can be performed without requiring movement of the camera relative to the event.

In one embodiment, latency corrections can be made based on groups of users, without injecting delay and/or configuring routes based on latency areas for all of the users accessing the media content. For example, the computing device 130 can perform latency correction on a group of user that have telepresence seats in proximity to each other. In another example, the grouping of the users can be based on a proximity to each other in the network. In these examples, by limiting the number of users, or otherwise dividing up the users, for which the latency correction is to be performed, the computing device 130 may reduce calculation time and use of computing resources. In one embodiment, all of the users can have latency corrections performed for their access to the media content and the video content, but the latency corrections can be performed in different calculations for different groups of users.

In one embodiment to further simulate the users being present at the event, viewing fields can be adjustable, while zooming or other visual effects can be disabled.

In one embodiment, the latency testing, the determination of the latency area, the configuration of the routes and/or the injection of the delay can be performed at various times, including during the telepresence session. For example, testing can be periodically performed during the telepresence session to determine if there has been a change to the latency area and/or a change to a delay period to be injected into the presentation of the telepresence configuration by one or more of the media processors. If a change is detected then corresponding corrections can be made, such as re-configuring routes and/or changing the delay time period.

In one embodiment, configuring routes based on latency areas and injecting a delay into the presentation of the telepresence configuration at a portion of the locations can be selectively applied based on thresholds. For example, injecting delay into the presentation of the telepresence configuration for a portion of the locations can be utilized without re-configuring routes based on latency areas when a first latency threshold has not been satisfied. However, when the first latency threshold is satisfied (e.g., latency time periods exceeding a pre-determined amount) then both techniques may be applied to synchronize the telepresence configurations at each of the locations.

In one embodiment, the delay can be implemented to video alone, audio alone and/or to both video and audio. In one embodiment, the delay period can be calculated for the video portion of the content and the audio portion can be synchronized with the video portion.

In one embodiment, the device(s) that perform the functions described herein can be selected based on capability. For example, if all media processors 106 have the ability to generate 3D video content then a distributed process can be utilized that does not utilize the computing device 130. If only a portion of the media processors 106 have the ability to generate 3D content then a master-slave arrangement can be established between the media processors 106 without the need to utilize the computing device 130. If none of the media processors 106 have the ability to generate 3D content then the computing device 130 can be utilized for generating 3D content. Similarly, 2D images captured by a 2D camera can be transmitted to a device capable of generating 3D video content, such as the computing device 130 and/or another media processor 106. In one embodiment, the selection of the device(s) can be based on other factors, including processing resources, workload, type of content and so forth. For example, if only one media processor 106 has the capability to generate 3D content then the computing device 130 may be utilized along or in conjunction with the select media processor for generating the 3D content.

In one embodiment, the providing of the telepresence configuration can be done in conjunction with a social network application. For example, each of the users can be members of the social network and the establishing of the communication session between the different users can be initiated based on selections made from the social network application.

In one embodiment, the presentation of the telepresence configuration by a media processor 106 can be done at multiple display devices. For example, in a system that has three display devices positioned adjacent to each other, the media processor 106 can provide a middle display device with the media content for presentation while providing the end display devices with each of the video content from the other users to simulate the other users being co-located at the event.

Other suitable modifications can be applied to the present disclosure without departing from the scope of the claims below. Accordingly, the reader is directed to the claims section for a fuller understanding of the breadth and scope of the present disclosure.

Figure 11:
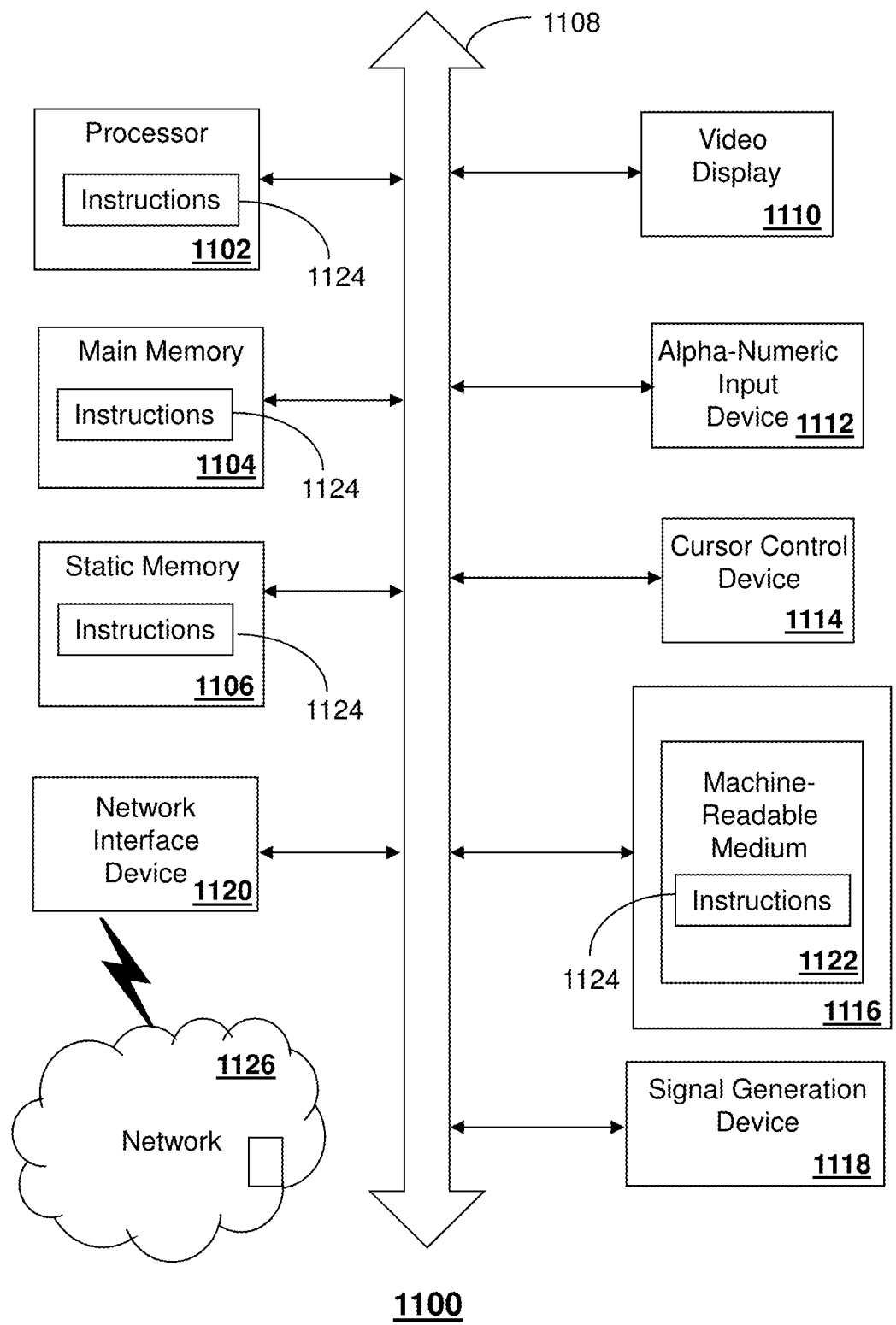
FIG. 11 is a diagrammatic representation of a machine in the form of a computer system within which a set of instructions, when executed, may cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor or controller 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. The devices of computer system 1100 can be found in the previously shown figures, such as computing device 130, camera systems 575, 775, camera 175, media processor 106, TV 202 and so forth.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor or controller 1102 during execution thereof by the computer system 1100. The main memory 1104 and the processor 1102 also may constitute machine-readable media. The instructions 1124 can include one or more of the steps described above, including calibration steps, such as determining or interpolating viewer distance, determining convergence from viewer distance, and so forth.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure can include a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP), as well as the examples for calibration, distance determination, communication protocols, and so forth, represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are can included by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
providing, by a processing system including a processor, a telepresence session for a plurality of participants;
identifying, by the processing system, latency network elements based on a latency test performed with respect to a plurality of network elements of a communication network that each form a portion of a potential route for transmission of telepresence session signals to the respective participants, wherein the latency network elements and an additional network element form a latency area, wherein the additional network element is included in the latency area based on a topology of the communication network and is not identified as a latency network element; and
performing, by the processing system, a latency correction with respect to a group of participants in proximity to each other, wherein the group comprises fewer participants than the plurality of participants,
wherein performing the latency correction comprises providing a delay of a presentation of a telepresence configuration, configuring a route for the transmission of the telepresence session signals avoiding a portion of the latency area, or a combination thereof.

2. The method of claim 1, wherein the group of participants have telepresence seats in proximity to each other.

3. The method of claim 1, wherein the group of participants have proximity to each other in the communication network.

4. The method of claim 1, wherein the plurality of participants comprises a first group and a second group, a first latency correction is performed with respect to the first group, and a different second latency correction is performed with respect to the second group.

5. The method of claim 1, wherein the identifying further comprises analyzing latency parameters of network elements of the communication network obtained using packet latency telemetry.

6. The method of claim 5, wherein the latency parameters are obtained periodically, and wherein the latency parameters are selected based on a known or predicted cause of latency.

7. The method of claim 5, wherein the analyzing is performed during the telepresence session.

8. The method of claim 1, wherein the latency correction is performed responsive to a latency time period exceeding a predetermined threshold.

9. The method of claim 8, wherein a combination of providing the delay of the presentation of the telepresence configuration and configuring a route for the transmission of the telepresence session signals is performed responsive to the latency time period exceeding the threshold.

10. The method of claim 1, wherein the telepresence session comprises an audio portion and a video portion, and wherein performing the latency correction comprises providing a delay of a presentation of the video portion and synchronizing the audio portion with the video portion.

11. The method of claim 1, wherein the telepresence session is provided using a social network application, wherein each of the participants is associated with the social network application.

12. A device comprising:
a processing system including a processor; and
a memory that stores executable instructions that, when executed by the processing system, facilitate performance of operations comprising:
providing a telepresence session for a plurality of participants;
identifying latency network elements based on a latency test performed with respect to a plurality of network elements of a communication network that each form a portion of a potential route for transmission of telepresence session signals to the respective participants, wherein the latency network elements and an additional network element form a latency area, wherein the additional network element is included in the latency area based on a topology of the communication network; and performing a latency correction with respect to a group of participants in proximity to each other, wherein the group comprises fewer participants than the plurality of participants, wherein the group of participants have telepresence seats in proximity to each other, have proximity to each other in the communication network, or both, and wherein performing the latency correction comprises providing a delay of a presentation of a telepresence configuration, configuring a route for the transmission of the telepresence session signals avoiding a portion of the latency area, or a combination thereof.

13. The device of claim 12, wherein the plurality of participants comprises a first group and a second group, a first latency correction is performed with respect to the first group, and a different second latency correction is performed with respect to the second group.

14. The device of claim 12, wherein the latency correction is performed responsive to a latency time period exceeding a predetermined threshold.

15. The device of claim 14, wherein a combination of providing the delay of the presentation of the telepresence configuration and configuring a route for the transmission of the telepresence session signals is performed responsive to the latency time period exceeding the threshold.

16. The device of claim 12, wherein the telepresence session is provided using a social network application, wherein each of the participants is associated with the social network application.

17. A non-transitory machine-readable storage medium, comprising executable instructions that, when executed by processing system including a processor, facilitate performance of operations comprising:

providing a telepresence session for a plurality of participants;

identifying latency network elements based on a latency test performed with respect to a plurality of network elements of a communication network that each form a portion of a potential route for transmission of telepresence session signals to the respective participants, wherein the latency network elements and an additional network element form a latency area; and performing a latency correction with respect to a group of participants in proximity to each other, wherein the group comprises fewer participants than the plurality of participants, and wherein the group of participants have telepresence seats in proximity to each other, have proximity to each other in the communication network, or both, wherein performing the latency correction comprises providing a delay of a presentation of a telepresence configuration, configuring a route for the transmission of the telepresence session signals avoiding a portion of the latency area, or a combination thereof.

18. The non-transitory machine-readable storage medium of claim 17, wherein the additional network element is included in the latency area based on a topology of the communication network.

19. The non-transitory machine-readable storage medium of claim 17, wherein a combination of providing the delay of the presentation of the telepresence configuration and configuring a route for the transmission of the telepresence session signals is performed responsive to a latency time period exceeding a predetermined threshold.

20. The non-transitory machine-readable storage medium of claim 17, wherein the plurality of participants comprises a first group and a second group, a first latency correction is performed with respect to the first group, and a different second latency correction is performed with respect to the second group.

* * * * *